US006208949B1

(12) United States Patent
Eatwell

(10) Patent No.: US 6,208,949 B1
(45) Date of Patent: Mar. 27, 2001

(54) METHOD AND APPARATUS FOR DYNAMICAL SYSTEM ANALYSIS

(75) Inventor: Graham P. Eatwell, Annapolis, MD (US)

(73) Assignee: Adaptive Audio, Inc., Annapolis, MD (US)

(*) Notice: Subject to any disclaimer, the term of this patent is extended or adjusted under 35 U.S.C. 154(b) by 0 days.

(21) Appl. No.: 09/108,253

(22) Filed: Jul. 1, 1998

(51) Int. Cl.[7] ................................................. G06F 19/00
(52) U.S. Cl. ........................... 702/189; 700/108; 702/182
(58) Field of Search ............................... 700/108, 174; 702/108–113, 117, 182–185, 189–193; 327/39, 45, 50, 60, 46

(56) References Cited

U.S. PATENT DOCUMENTS

| | | |
|---|---|---|
| 4,677,676 | 6/1987 | Eriksson . |
| 5,033,082 | 7/1991 | Eriksson et al. . |
| 5,390,106 * | 2/1995 | Cederblad et al. . |
| 5,469,087 | 11/1995 | Eatwell . |
| 5,553,153 | 9/1996 | Eatwell . |
| 5,943,637 * | 8/1999 | Okumura et al. . |

OTHER PUBLICATIONS

Åström et al, "Adaptive Control" Addison–Wesley Pub., pp. 302–327.
Eatwell, Dr., "Tonal Noise . . . " Active 95, Jul. 6, 1995, pp. 1087–1096.
Haykin, S., "Adaptive Filter Theory" Prentice Hall Pub., pp. 244–266.
Shynk, J., "Frequency–Domain and Multirate . . . " IEEE, Jan. 1992 pp. 15–37.
Vold et al, "Multi Axle Order . . . " Sound and Vibration, May 1997 pp. 30–34.
Widrow et al, "Adaptive Signal Processing" Prentice–Hall pp. 288–292.

* cited by examiner

*Primary Examiner*—Thomas M. Heckler
(74) *Attorney, Agent, or Firm*—Michael de Angeli

(57) ABSTRACT

A method and apparatus are provided for simultaneously characterizing the disturbance of a dynamical system and the dynamic response model of the system. The disturbance is characterized by a sum of reference signals weighted by disturbance parameters. The dynamic response model is similarly characterized by a set of response parameters, which model the relationship between a set of test signals and the response to these test signals. The disturbance parameters and the response parameters are estimated jointly to provide a characterization of the dynamical system. This estimation is achieved by sensing the system at one or more locations to obtain a sensed signal, obtaining reference signals related to the disturbances, synthesizing an estimate of the sensed signal from the reference signals, the test signals, the disturbance parameters and the response parameters, and jointly adjusting the disturbance parameters and the response parameters according to the difference between the synthesized signal and the sensed signal. The characterization may be incorporated in systems or methods for control or monitoring of dynamical systems.

45 Claims, 12 Drawing Sheets

METHOD AND APPARATUS FOR DYNAMICAL SYSTEM ANALYSIS

FIELD OF THE INVENTION

This invention relates to the monitoring, testing and control of dynamical systems.

INTRODUCTION AND BACKGROUND ART

In dynamical systems, at least one property of the system varies with time in response to external disturbances. Examples include acoustical systems where the fluid pressure or velocity varies, mechanical systems where stresses or displacement varies, electrical system where the voltage or current varies and optical systems where the intensity of light varies. The analysis of dynamical systems is important in a great many areas, including monitoring, testing and control. There are usually two primary objectives (1) characterization of the dynamic disturbance of the system and (2) characterization of a dynamic response model which predicts how the system will respond to external disturbances. For example, in a control system, the disturbance must be characterized to determine if control action is required and the dynamic response model must be known in order to determine the appropriate control signal to apply.

Disturbance Characterization

Disturbances can be classified as being either broadband or narrowband. An example of broadband noise is wind noise heard in an automobile cabin. Examples of narrowband noise include the hum produced by a power transformer or the repetitive vibration of a rotating machine. Stationary, broadband signals, such as that which results from a recording of the noise from an air-conditioning vent, are usually characterized mathematically by a power spectrum, such as obtained by a third-octave spectral analysis, while transient broadband signals, such as impacts, may be characterized by time-frequency analysis, such as the short-term Fourier transform and the spectrogram or a wavelet transform.

This invention relates to the analysis of transient, broadband and narrowband disturbances.

Narrowband disturbances are so called because the majority of the power in the disturbance is concentrated in narrow frequency bands. The position of the frequency bands is determined by the external source of the disturbance and can therefore change when the source changes. Narrowband disturbances are often characterized by order analysis. In order analysis, the power of the disturbance in each of the narrow frequency bands is estimated, this contrasts to Fourier analysis in which the frequency bands are fixed and are not related to the source. Order analysis is used in many areas, for example: noise and vibration analysis, condition based monitoring of rotating machines, active noise and vibration control, higher harmonic control, machinery balancing and alignment. Order analysis systems typically use a synchronization signal. The analysis is performed either by a bank of tracking filters, which separate the signal into narrow frequency bands and then compute the power in each band, or by synchronous sampling in which the sampling rate is varied so that the frequencies of a discrete Fourier transform coincide with the frequencies of the source. Tracking filters have a major disadvantage in that there is a fundamental trade-off between the bandwidth of the filter (which should be narrow to reject noise and nearby tonal components) and the ability to track changing signals (which requires a broader filter to reduce delay). An example of such a system is shown in FIG. 1. A sensor 2 is used to sense the disturbance of a dynamic system 1 and produce a signal 3. A synchronizing signal 100, derived from a tachometer for example, is indicative of the frequency or phase of the system. The synchronizing signal is passed to tone generators 101, 101', 101" which each generate complex (in-phase and quadrature) signals at one of the harmonics of the fundamental frequency of the disturbance. The signal 3 is multiplied at 102, 102', 102" by each of the complex signals and passed through low pass filters 103, 103', 103" (which may be integrators) to produce estimates of the complex amplitudes at each harmonic frequency, as indicated 104, 104', 104". These estimated signals provide an indication of the amplitude of the disturbance at the harmonic frequency. This process is known as heterodyning. Synchronous sampling techniques are better at separating the harmonic components, but require more expensive electronic hardware to perform the synchronous sampling and cannot be used simultaneously for broadband analysis. The use of tracking filters in a system for active control is described in U.S. Pat. No. 5,469,087 (Eatwell).

Neither system is very effective when multiple disturbance sources at different frequencies are present. In 'Multi Axle Order Tracking with the Vold-Kalman Tracking filter', H. Vold et al, Sound & Vibration Magazine, May 1997, pp30–34, a system for tracking multiple sources is described. This system estimates the complex envelopes of the signal components subject to the constraint that the envelopes can be represented locally by low-order polynomials. The resulting process is not well suited to implementation in 'real-time', and would result in considerable processing delay because of the nature of the constraints. This makes it unsuitable for application to real-time control systems. In addition, the process is numerically intensive. The measurement of disturbances experienced by rotating or reciprocating machinery often requires the use of multiple sensors. The data from these sensors is transmitted to a computer system for processing and analysis. The combination of multiple sensors and moderate frequency bandwidths will results in high data transfer rates. Considerable benefit would result if the data could be compressed before transmission or storage.

Characterization of Dynamic Response Model

System identification is the process of building a mathematical model of a dynamical system based on measurements of response of the system to known disturbances. This is usually done by applying the known disturbances to a mathematical model and then adjusting the parameters of the model until the output of the model is as close as possible to the measured output from the real system. This model is referred to as the system model or the dynamic response model.

System identification is a central part of modal analysis and control systems. In modal analysis, the dynamic response model of the system is parametrized by the frequency, damping and shape of a number of resonant modes. In order to conduct a modal analysis of a system it is usually necessary to cease the operation of the system. This means that modal analysis cannot be part of an on-line condition monitoring system.

System identification is also a central part of an adaptive control system, such as used for active noise and vibration control. In most control systems, a mathematical model of the physical system is assumed to be known from prior measurements or from numerical or analytical modelling. Once this information is known, the state of the system (usually current and prior conditions) can be estimated using known techniques. For example, if the statistics of the disturbance are known, an optimal 'observer' may be used to estimate the current system state.

An example of a control system with on-line system identification is shown in FIG. 2. Test signal 4 is added at 75 to the output 74 of control system 114 to produce an actuator drive signal 76. The actuator 77 excites the dynamic system 1. The response of the dynamic system is measured by sensor 2 to produce sensor signal 3. The component of the sensor signal that is due to the test signal is estimated by passing the test signal 4 through adaptive filter 110 to produce an estimated response signal 111. This is subtracted from the sensor signal at 112 to give error signal 113, which is in turn used to adapt the coefficients of the filter 110. The control system 114 is responsive to the sensor signal 3 and, optionally, a reference signal 4. The system model is provided by the filter 110. Examples of such a control system are disclosed in U.S. Pat. No. 4,677,676 (Eriksson) and U.S. Pat. No. 5,553,153 (Eatwell).

Combined Systems

In some areas, such as system identification or modal testing, only the system model is required. In other areas, such as noise monitoring, only the characterization of the dynamic disturbance is required. However, in many areas, such as control of dynamical systems and condition-based monitoring of dynamical systems, both the dynamic disturbance and the system model are of interest and, moreover, they need to be measured at the same time.

For example, in many practical control systems the dynamic response of the physical system is time varying, in that the response to a given disturbance at one time will be different to the response to the same disturbance at a later time. In these cases it is necessary to continually re-estimate the dynamic response model whilst maintaining control of the system. One approach is described in chapter 7 of 'Estimation and Control Interaction', K. J. Åstöm and B. Wittenmark, Addison Wesley, 1989. The problem of Stochastic Adaptive Control is discussed, in which a hyperstate of system response parameters and signals is posed; i.e. the parameters are treated as slowly varying signals. No solutions to the problem are presented, except for an artificial example. One of the problems with this approach is that the signals usually vary much faster than the system parameters, so the problem will be ill-conditioned. Also, the processes discussed are not subject to external disturbances. In a disturbance control system, such as an active noise or vibration control system, the disturbance and the control signal will be highly correlated, so the control signal u and the process output y are not sufficient to characterize the system.

In prior disturbance control systems, the problems of system identification and control are addressed separately This results in an inefficient system which is subject to inaccuracies or slow operation.

In prior practical control systems, the estimation of the dynamic response is achieved by adding a low level test signal to the controller output and correlating this with the response at the system inputs. There are two major problems with this. Firstly, the level of the test signal must be kept low so that the control is not adversely affected, and secondly, as a consequence, the convergence rate of the estimation must be slow in order to decorrelate the test signal and the residual disturbance. This is a particular problem especially at start up when the disturbance may be large.

In on-line condition monitoring, the sound or vibration of a machine is monitored to determine if the machine is operating normally. Such a monitoring system infers information about the machine from the disturbance signals alone. In many machine failures the dynamic response of the system will also change prior to failure, so the monitoring could be improved significantly if the dynamic response could be measured. One of the main aims of condition-based maintenance is to avoid stopping the machine unnecessarily for checks, so it is usually not possible to stop the machine to perform a modal analysis or other system response measurement.

There is therefore a need for an analysis technique that can simultaneously characterize the a disturbance of a dynamical system and its dynamic response. There is also a need for an analysis technique that can simultaneously characterize the narrowband and broadband components of the disturbance, even when more than one narrowband source is present. There is also a need for an improved analysis system that can track rapid changes in disturbance and response parameters.

Objects

In view of the above limitations in the known art, an object of the current invention is to provide a method and apparatus for simultaneous characterization of the disturbance and the dynamic response model of a dynamical system.

A further object is to provide a method and apparatus for simultaneous characterization of narrowband and broadband components of the disturbance of a dynamical system.

A still further object of the invention is to provide a method and apparatus for estimating the disturbance parameters of a dynamical system and using them to provide a compressed representation of the disturbance.

A still further object of the invention is to provide a method and apparatus for controlling a dynamical system in which the control system simultaneously characterizes the disturbance and the dynamic response model of a dynamical system.

SUMMARY OF INVENTION

The current invention is a method and apparatus for simultaneously characterizing the disturbance of a dynamical system and the dynamic response model of the system. The disturbance is characterized as a weighted sum of reference signals rather than the disturbance signals themselves. The weights in this sum are referred to as disturbance parameters. The dynamic response model is characterized by a set of response parameters which model the relationship between a set of test signals and the response to these test signals.

Together, the disturbance parameters and the response parameters characterize the state of the dynamical system (sometimes also called the hyperstate).

The disturbance parameters and the response parameters are jointly estimated to provide a characterization of the dynamical system. This estimation is achieved by obtaining reference and test signals related to the disturbances, sensing the system at one or more locations to obtain sensed signals, synthesizing an estimate of the sensed signal from the reference signals, the test signals, the disturbance parameters and the response parameters, and jointly adjusting the disturbance parameters and the response parameters according to the difference between the synthesized signal and the sensed signal.

The principal outputs generated are: (1) the synthesized signal and its components (2) the disturbance and signal parameters (3) the difference signal between the synthesized signal and the sensed signal (the sensed signal may also be considered as an output, since the difference signal can be simply calculated from the sensed signal and the synthesized signal).

The difference signal contains important information concerning the mis-adjustment of the parameters and unmodelled disturbance and will be described in more detail later In prior systems, the disturbance parameters and response parameters are estimated independently, whereas in the current system the parameters are estimated jointly.

BRIEF DESCRIPTION OF THE DRAWINGS

These and other objects of the invention will become apparent when reference is made to the accompanying dryings in which.

DETAILED DESCRIPTION OF THE INVENTION

General Description

Figure 1:
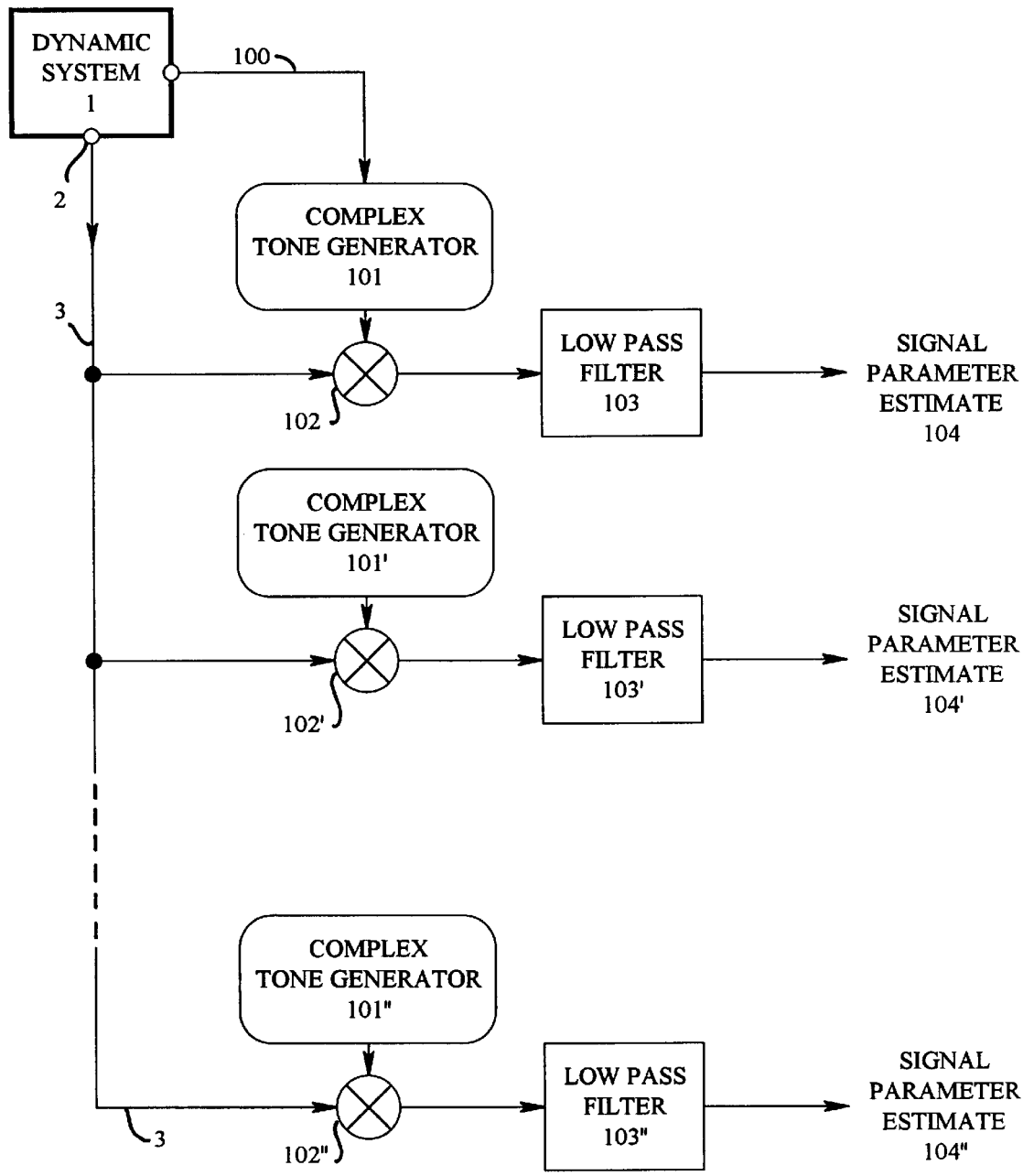
FIG. 1 is a diagrammatic view of a tonal signal analysis system of the prior art.
Figure 2:
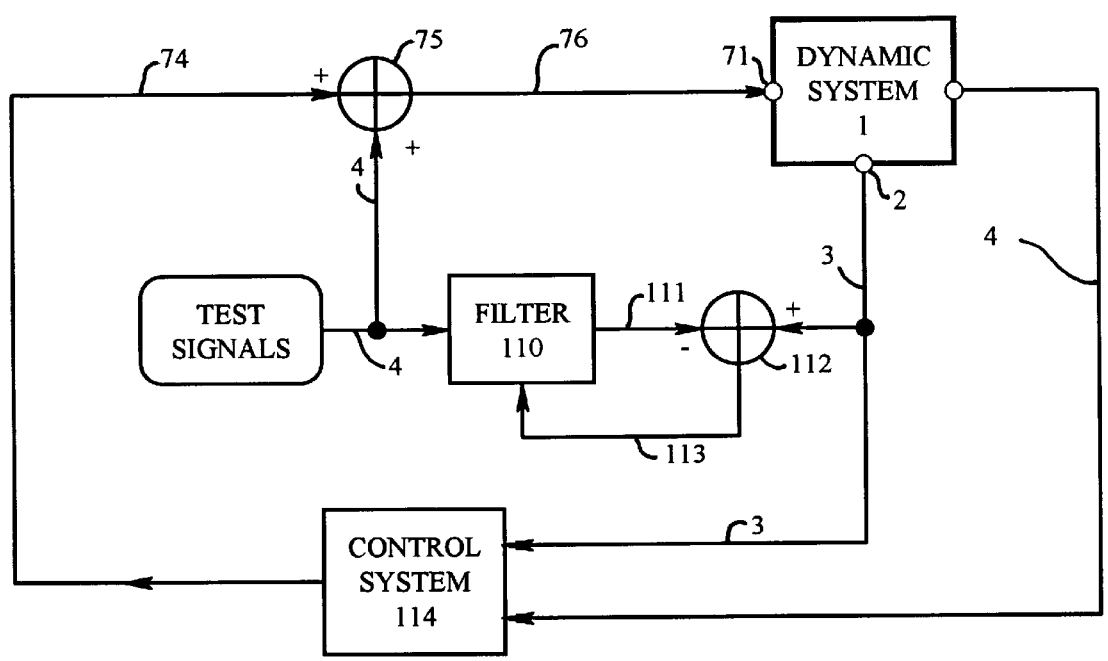
FIG. 2 is a diagrammatic view of a prior art control system with on-line system identification.
Figure 3:
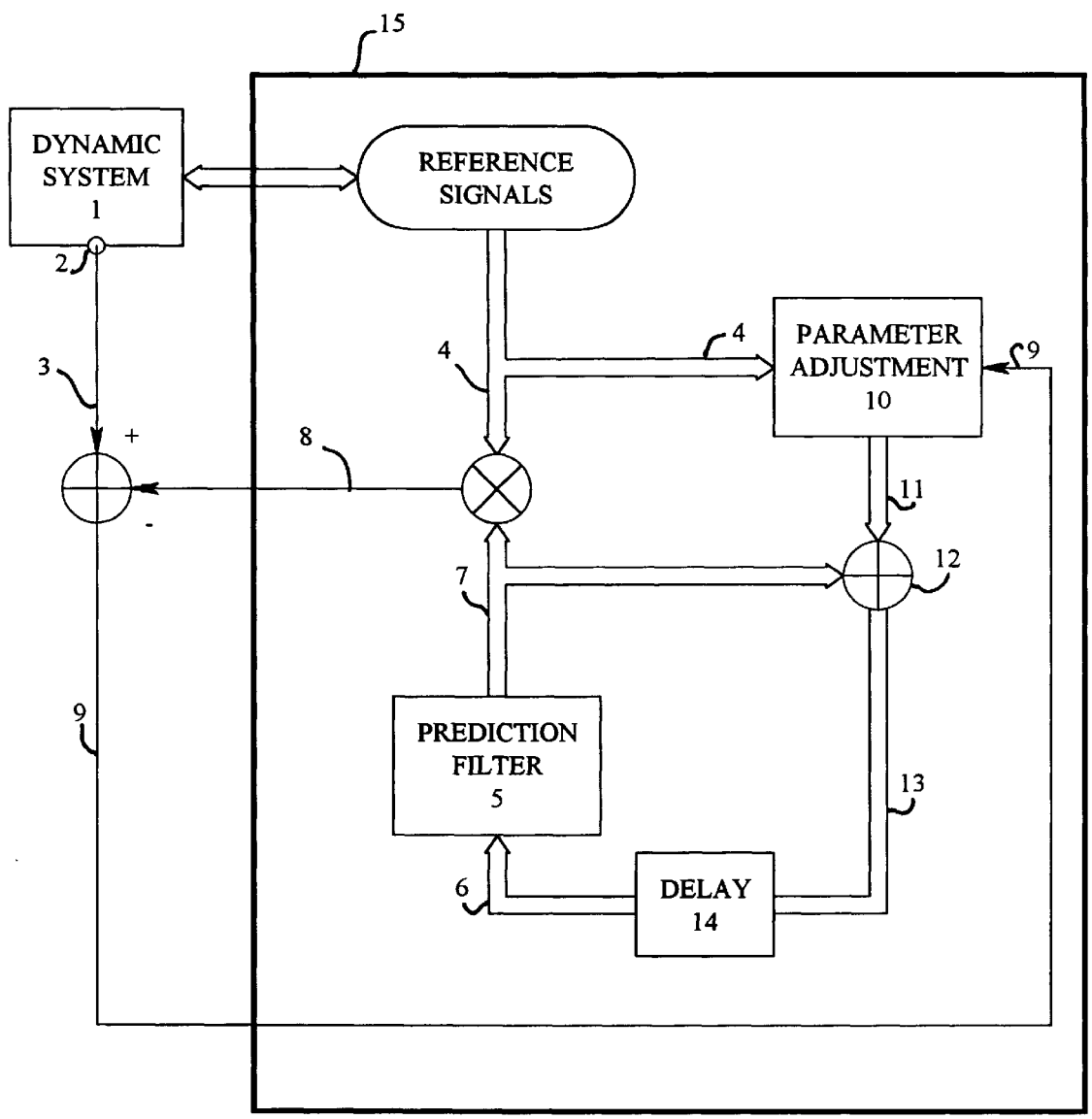
FIG. 3 is a diagrammatic view of a dynamic system analyzer of the current invention

A system of the current invention is shown in FIG. 3. It comprises a dynamic system analyzer 15" for analyzing a dynamical system 1. Sensor 2 senses the disturbance of the system and produce sensor signal 3. Reference and/or test signals 4" and predicted parameters 5" are combined to produce synthesized signal 6". The reference signals are time-related to the disturbance and are generated either from additional disturbance sensors or from signal generators. The test signals are known signals that are use to produce disturbances in the system. The predicted parameters 5" are obtained by passing previous estimates of the parameters 7" through a prediction filter 8". An error signal 9 is calculated as the difference between the synthesized signals 6" and the sensor signals 3. The error signal 9 and the reference signals 4" are used in parameter adjuster 10" to generate a correction 11" to the predicted parameters 5". The correction and the predicted parameters are combined at 12" to generate a new estimate of the parameters 13". The new parameters are delayed at 14" to produce the previous parameters 7".

The principal outputs generated are the synthesized signal 6", the estimated parameters 13" or the predicted parameters 5", and the error signal 9.

FIG. 3 shows a general system analyzer for estimating a complete parameter set. However, the system may be more easily described if the reference signals and test signals are separated into two groups. The first group of signals are test signals, usually generated by the analyzer, which are used to generate disturbances in the dynamical system. The second group of signals are reference signals which are time-related to unknown disturbances in the dynamical system and are usually derived from sensor signals.

Figure 4:
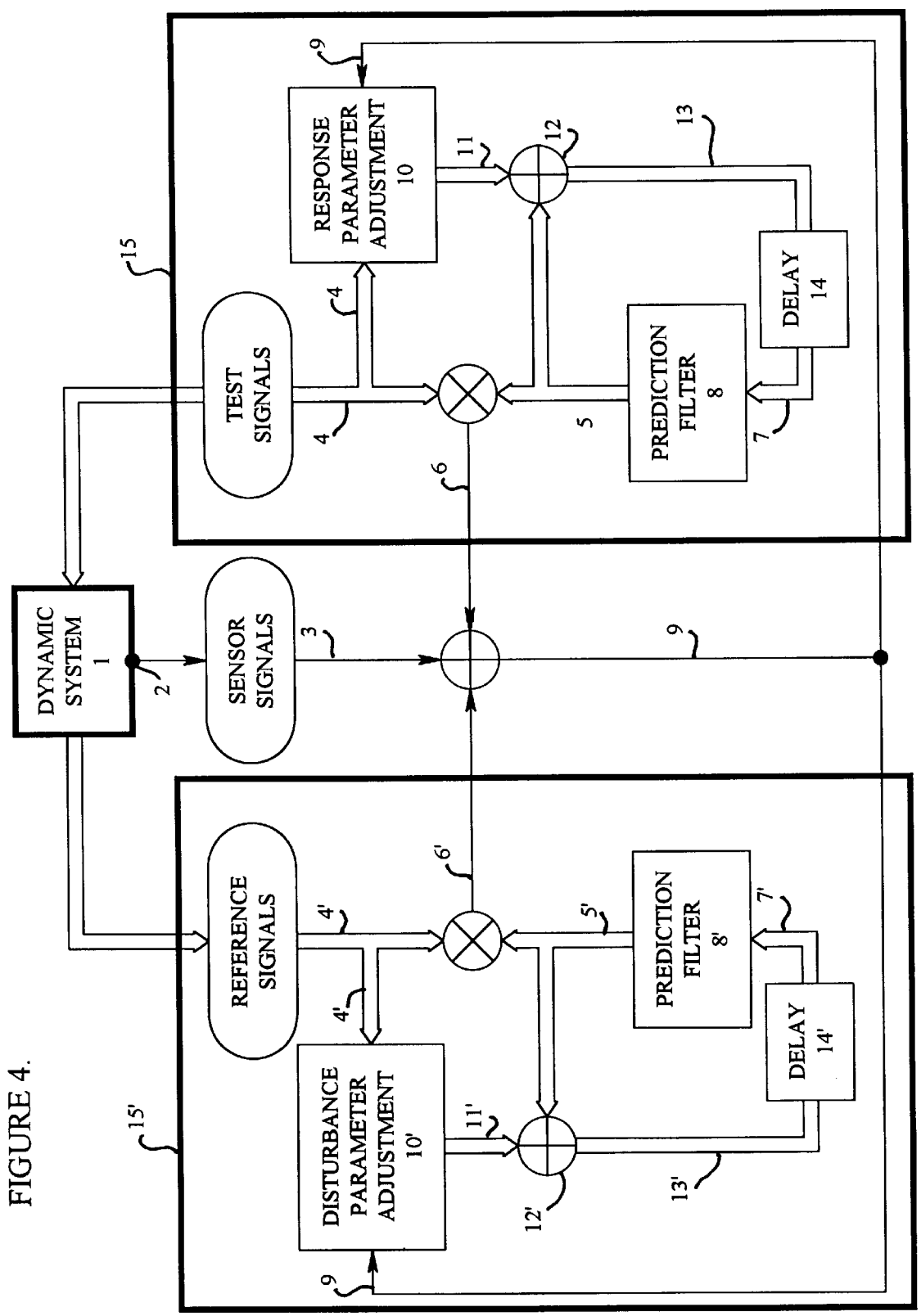
FIG. 4 is a diagrammatic view of a dynamic system analyzer of the current invention showing disturbance synthesizer and response synthesizer.

We therefore begin by considering a dynamical system excited by two sets of disturbances, an unknown set and a known, controlled set. With reference to FIG. 4, the signal s(n) 3 at time sample n which results from a measurement of the system disturbance by sensor 2, is assumed to be the combination of a component u(n) due to the unknown disturbances and a component r(n) which is the response to the controlled disturbances. That is, $$s(a)=u(n)+r(n). \tag{1}$$

The sensed signal can be written as $$s(n)=u_s(n)+r_s(n)+\epsilon(n) \tag{2}$$

where $r_s(n)$, 6, is a synthesized response signal and $u_s(n)$, 6', is a synthesized disturbance signal. $\epsilon(n)$, 9, is the total unmodelled component of the signal. The synthesis of the signals will now be described Response Synthesizer The response synthesizer is shown as 15 in FIG. 4. The component r(n) of sensor signal 3 which is the response to the test signals can be written as $$r(n) = \sum_{j=0}^{J-1} a_j(n) r_j(n) + \epsilon_0(n) = a(n)^T r(n) + \epsilon_0(n), \tag{3}$$

where $a(n)=\{a_0(n), a_1(n), \ldots, a_{J-1}(n)\}^T$ is a vector of time varying response parameters $a_j(n)$, which characterize the system response and $r(n)=\{r_0(n), r_1(n), \ldots, r_{J-1}(n)\}^T$ is a vector of test signals (the superposed T is used to denote the transpose of a vector or a matrix, bold lettering is used to denote vector quantities). r(n) is denoted by 4 in FIG. 4. $\epsilon_0(n)$ is the component of the disturbance which is not predicted by the model.

The test signals are used to drive actuators which cause a disturbance to the dynamical system. For example, an electromagnetic actuator may be used to excite a mechanical system or a loudspeaker used to excite an acoustical system.

The response to the controlled disturbances can thus be written as a weighted sum of the signals $r_j(n)$ with weights given by the response parameters $a_j(n)$. The response is said to be synthesized from the test signals, and the signal $r_s(n)=a(n)^T r(n)$ is the synthesized response signal.

As an example, for a single controlled disturbance driven by a signal t(n), the response can be modelled as $$r(n) = \sum_{k=0}^{K-1} c_k(n) t(n-k) \tag{4}$$

in which case the parameter vector is $$a(n)=\{c_0(n), c_1(n), \ldots, c_{K-1}(n)\}^T \tag{5}$$

and the test signal vector is $$r(n)=\{t(n), t(n-1), \ldots, t(n-K+1)\}^T. \quad (6)$$

As a more general example, when there are L controlled disturbances driven by the test signals $t_l(n)$ for $l=0, 1, \ldots L-1$ and the system is a linear system, the response at sensor m to the controlled disturbances can be modelled as $$r_m(n) = \sum_{l=0}^{L-1}\sum_{k=0}^{K-1} c_k^{ml}(n)t_l(n-k) + \sum_{p=1}^{P-1} d_p^m(n)r_m(n-p) + \epsilon_0(n) \quad (7)$$

where $c_k^{ml}(n)$ and $d_p(n)$ are time varying parameters which characterize the system response. In this example $$a(n) = \begin{bmatrix} a_0(n) \\ a_1(n) \\ \vdots \\ a_{M-1}(n) \end{bmatrix}, \quad (8)$$

where $$a_m(n) = \{c_0^{m0}(n), c_1^{m0}(n), \ldots, c_{K-1}^{m0}(n),$$

$$c_0^{m1}(n), c_1^{m1}(n), \ldots, c_{K-1}^{m1}(n),$$

$$c_0^{m,L-1}(n), c_1^{m,L-1}(n), \ldots, c_{K-1}^{m,L-1}(n),$$

$$d_1^m(n), d_2^m(n), \ldots, d_{P-1}^m(n)\}^T \quad (9)$$

is the vector of response parameters and the vector of test signals is $$r(n) = \begin{bmatrix} r_0(n) \\ r_1(n) \\ \vdots \\ r_{M-1}(n) \end{bmatrix}, \quad (10)$$

where $$r_m(n) = \{t_0^m(n),$$

$$t_0^m(n-1), \ldots, t_0^m(n-K+1),$$

$$t_1(n), t_1(n-1), \ldots, t_1(n-K+1),$$

$$\ldots, t_{L-1}(n), t_{L-1}(n-1), \ldots, t_{L-1}(n-K+1),$$

$$r_m(n-1), r_m(n-2), \ldots, r_m(n-P+1)\}^T. \quad (11)$$

The elements of signals r(n) are known, whereas the elements of a(n) are unknown and must be estimated.

The response synthesizer is shown as 15 in FIG. 4. The actual values of the response parameters are unknown, so, at time sample n, the synthesized response $\hat{r}(n)$ 6 is obtained from a prediction of the parameters $\hat{a}(n|n-1)$ 5 and the test signals r(n) 4 as $$\hat{r}(n)=\hat{a}(n|n-1)^T r(n). \quad (12)$$

$\hat{a}(n|n-1)$ is the prediction of a(n) at time sample n using information available at time sample n-1. $\hat{a}(n|n)$ will also be written simply as $\hat{a}(n)$.

Disturbance Synthesizer

The disturbance synthesizer is shown as 15' in FIG. 4. It is assumed that at least some component of the unknown disturbance, which corresponds to one component of sensor signal 3, can be modelled as a weighted sum of reference signals. For example, these reference signals may be produced by sensors responsive to the disturbance at other locations. When a component of the disturbance is cyclic in nature, the reference signals may be sine and cosine signals at frequencies which are multiples of the fundamental frequency of the cyclic disturbance or combinations thereof. We denote the $k^{th}$ reference signal at sample n by $x_k(n)$.

The unknown disturbance can be written as $$u(n) = \sum_{k=0}^{K-1} b_k(n)x_k(n) + \epsilon_1(n) = b(n)^T x(n) + \epsilon_1(n), \quad (13)$$

where b(n) is a vector of unknown disturbance parameters, $b_k(n)$, and $\epsilon_1(n)$ is the component of the disturbance which is unrelated to the reference signals. $x(n)=\{x_0(n), x_1(n), \ldots, x_{K-1}(n)\}^T$ is the vector of reference signals, which is denoted by 4' in FIG. 4. The disturbance is said to be synthesized from the reference signals, and the signal $u_s(n)=b(n)^T x(n)$ is the synthesized disturbance signal.

In one embodiment, for use when the disturbance is cycle or periodic, the reference signals at sample n are given by $$x_{2k}(n)=\cos(k\phi_n) \quad (14)$$

$$x_{2k+1}(n)=\sin(k\phi_n) \quad (15)$$

where the phase angle $\phi_n$ is determined by the current position in the cycle of the disturbance. $\phi_n$ may be determined from a sensor, such as a tachometer or accelerometer, or may be estimated by integrating the fundamental frequency of the disturbance.

When more than one periodic disturbance is present additional reference signals may be used for the additional disturbances.

In another embodiment, for use with broadband signals, the vector of reference signals is given by $$x(n)=\{x(n), x(n-1), \ldots, x(n-K+1)\}^T, \quad (16)$$

where x(n) is a sensor signal. The vector of reference signals contains current an previous samples of the sensor signal.

In a further embodiment, both types of reference signals are used.

The disturbance synthesizer is shown as 15' in FIG. 4. The actual values of the disturbance parameters are unknown, so, at time sample n, the synthesized disturbance $\hat{u}(n)$ 6' is obtained from a prediction of the parameter vector $\hat{b}(n|n-1)$ 5' and the reference signals x(n) 4' according to $$\hat{u}(n)=\hat{b}(n|n-1)^T x(n). \quad (17)$$

In an alternative embodiment, the synthesized disturbance $\hat{u}(n)$ is obtained from the previous parameters $\hat{b}(n-1|n-1)$ and the reference signals x(n) as $$\hat{u}(n)=\hat{b}(n-1|n-1)^T x(n). \quad (18)$$

Parameter Prediction.

In some operating environments, such as a slow temperature increase for example, it is possible to model the time variation of the parameters using a stochastic model. For example, the models $$a(n)=F_a\{a(n-1), a(n-2), a(n-3), \ldots\}+v_a(a) \quad (19)$$

and $$b(n)=F_b\{b(n-1), b(n-2), b(n-3), \ldots\}+v_b(n) \quad (20)$$

may be used, where $F_a$ and $F_b$ are prescribed functions and $v_a(n)$ and $v_b(n)$ are stochastic (noise) signals.

Since the parameters are usually assumed to be slowly varying compared to the signals, they may bethought of as being generated by passing random parameters through a low pass filter Examples of these models are $$a_k(n) = \sum_{p=1}^{P-1} \alpha_{k,p} a_k(n-p) + v_{a,k}(n) \quad (21)$$

and $$b_k(n) = \sum_{p=1}^{P-1} \beta_{k,p} b_k(n-p) + v_{b,k}(n) \quad (22)$$

where $\alpha_{k,p}$ and $\beta_{k,p}$ are the coefficients of a prediction filter In this model, the current parameter may be predicted from the P−1 previous values with an error of v(n). The prediction filter is typically a smoothing filter or low-pass filter The coefficients of the filters themselves may depend upon other physical parameters such as the operating condition of the machine being monitored (speed, acceleration temperature etc.). In matrix notation $$a(n) = \sum_{p=1}^{P-1} F_a(p) a(n-p) + v_a(n) \quad (23)$$

and $$b(n) = \sum_{p=1}^{P-1} F_b(p) b(n-p) + v_b(n), \quad (24)$$

where $F_a$ and $F_b$ are matrices. In the example above, $F_a$ and $F_b$ are diagonal matrices with elements $$[F_a(p)]_{kk} = \alpha_{k,p} \quad (25)$$

and $$[F_b(p)]_{kk} = \beta_{k,p} \quad (26)$$

In one embodiment of the synthesizers (15 and 15' in FIG. 4), the predicted parameters 5 and 5' are calculated from previous estimates of the parameters 7 and 7' as $$\hat{a}(n|n-1) = \sum_{p=1}^{P-1} F_a(p) \hat{a}(n-p) \quad (27)$$

and $$\hat{b}(n|n-1) = \sum_{p=1}^{P-1} F_b(p) \hat{b}(n-p) \quad (28)$$

respectively. This computation is performed by prediction filters 8 and 8'.

In the simplest case, the prediction are simply given by the previous estimates, i.e.

$$\hat{a}(n|n-1) = \hat{a}(n-1) \quad (29)$$

or $$\hat{b}(n|n-1) = \hat{b}(n-1). \quad (30)$$

The adjustment of the parameters will be discussed in detail below

General Analyzer

We now return to the general analyzer shown in FIG. 3 in which the disturbance parameters and the response parameters are combined.

As described above, the sensed signal 3 can be written in terms of the synthesized response and the synthesized disturbance, namely $$s(n) = u_s(n) + r_s(n) + \epsilon_0(n) + \epsilon_1(n)$$

$$= b(n)^T x(n) + a(n)^T r(n) + \epsilon(n), \quad (31)$$

where $\epsilon(n) = \epsilon_0(n) + \epsilon_1(n)$ is the total unmodelled component of the signal.

In vector notation, the relationship between the sensed signals and the parameters can be written compactly as $$s(n) = \phi^T f + \epsilon(n) \quad (32)$$

where $$f = \{a_0, a_1, \ldots a_{J-1}, b_0, b_1, \ldots, b_{K-1}\}^T = \begin{bmatrix} a \\ b \end{bmatrix}, \quad (33)$$

is the vector of unknown parameters and $$\phi = \{r_0, r_1, \ldots r_J, x_0, x_1, \ldots, x_K\}^T = \begin{bmatrix} r \\ x \end{bmatrix} \quad (34)$$

is the vector of signals, often called a regression vector, which contains both reference signals and test signals. The vector φ is denoted as 4" in FIG. 3.

In practical applications the parameters will usually vary more slowly than the signals themselves. This characteristic of the parameters can be included in the model so as to improve the accuracy and robustness of the final analysis. In particular, the future values of the parameters may be predicted from past values using a prediction filter 8".

The prediction filter 8" can be written in a standard state space form as $$\begin{bmatrix} f(n|n-1) \\ f(n-1) \\ \vdots \\ f(n-P+2) \end{bmatrix} = A \begin{bmatrix} f(n-1) \\ f(n-2) \\ \vdots \\ f(n-P+1) \end{bmatrix} + \begin{bmatrix} v(n) \\ 0 \\ \vdots \\ 0 \end{bmatrix}, \quad (35)$$

where v(n) is a noise signal and A is a matrix which contains the filter parameters. A has the form $$A = \begin{bmatrix} F(1) & F(2) & \ldots & F(P-1) \\ 1 & 0 & 0 & 0 \\ 0 & \ddots & \ddots & \vdots \\ 0 & 0 & 1 & 0 \end{bmatrix} \quad (36)$$

where F(p) are sub-matrices of filter coefficients given by $$F(p) \begin{bmatrix} F_a(p) & 0 \\ 0 & F_b(p) \end{bmatrix}. \quad (37)$$

The equation for the sensor signal can be rewritten as $$s(n) = [\phi^T, 0^T, \cdots, 0^T] \begin{bmatrix} f(n) \\ f(n-1) \\ \vdots \\ f(n-P+1) \end{bmatrix} + \epsilon(n). \tag{38}$$

Thus formulated, the equations 38 and 35 are in a standard state space form and may be solved recursively by well known methods, such as the well known Kalman filter (see for example, 'Adaptive Filter Theory', Simon Haykin, pp244–266, Prentice Hall, 1991). However, in practical applications the stochastic signals v(n) and $\epsilon$(n) are not known. Instead, the variances of the signals must be treated as parameters.

Adjustment of the Disturbance and Response Parameters

In order to update the estimates of the parameter vectors, an estimate of the unknown disturbance signal is synthesized by forming a sum of products of the reference signals with the predicted disturbance parameters. The synthesized disturbance signal is $$\hat{u}(n) = \sum_{k=0}^{K-1} \hat{b}_k(n|n-1)x_k(n) = \hat{b}(n|n-1)^T x(n), \tag{39}$$

where ^ denotes an estimated value. Similarly, an estimate of the response to the test signals is synthesized from the predicted response parameters and the test signals $$\hat{r}(n) = \sum_{j=0}^{J-1} \hat{a}_j(n|n-1)r_j(n) = \hat{a}(n|n-1)^T r(n). \tag{40}$$

The difference between the synthesized signals and the measured signal is given by $$e(n)=s(n)-\hat{u}(n)-\hat{r}(n) \tag{41}$$

Combining all of the parameters into a single vector, allows us to write $$e(n)=s(n)-\phi^T(n)\hat{f}(n|n-1), \tag{42}$$

where the predicted parameter vector, 5" in FIG. 3, is obtained from previous estimates using $$\hat{f}(n|n-1) = \sum_{p=1}^{P-1} F(p)\hat{f}(n-p). \tag{43}$$

The previous estimates $\hat{f}(n-p)$ 7" are obtained by passing the current estimate 13"through delay means 14".

Time Domain Parameter Adjustment

In this section one embodiment of the parameter adjustment, 10" in FIG. 3, is described in detail.

The estimate $\hat{f}(n)$ 13" of the current parameters is obtained by adding an adjustment 11" to the predicted parameter vector $\hat{f}(n|n-1)$ 5" at adder 12". In one embodiment the adjustment 11" is given by k(n)e(n), where k(n) is a gain vector and e(n) is error signal (9 in FIG. 3). Hence, the new estimate of the parameter vector is given by $$\hat{f}(n)=\hat{f}(n|n-1)+k(n)e(n). \tag{44}$$

The gain vector may be a function of the signal vector $\phi$, 4", the state transition matrix A and estimates of the statistics of the signals $\epsilon$ and v. For this embodiment the new parameter estimate can be re-written in terms of the sensor signal s(n) as $$\hat{f}(n)=[I-k(n)\phi^T(n)]\hat{f}(n|n-1)+k(n)s(n). \tag{45}$$

In general, the matrix $k(n)\phi^T(n)$ is not diagonal, so it is clear that the parameters are not updated independently of one another.

In one embodiment, the gain vector is calculated as $$k(n)=G(n)\phi(n), \tag{46}$$

where G(n) is a gain matrix. Examples for G(n) include $$G_1(n)=K(\phi^T(n)\phi(n)+\sigma^2)^{-1}, \tag{47}$$

where K is a diagonal matrix and $\sigma^2$ is positive constant (which may be set depending on the variance of the error signal, since this is strongly related to the unmodelled signal) and $$G_2(n)=K<\phi(n)\phi^T(n)+\sigma^2>^{-1}, \tag{48}$$

in which the angled brackets < > denote the expected value.

Figure 5:
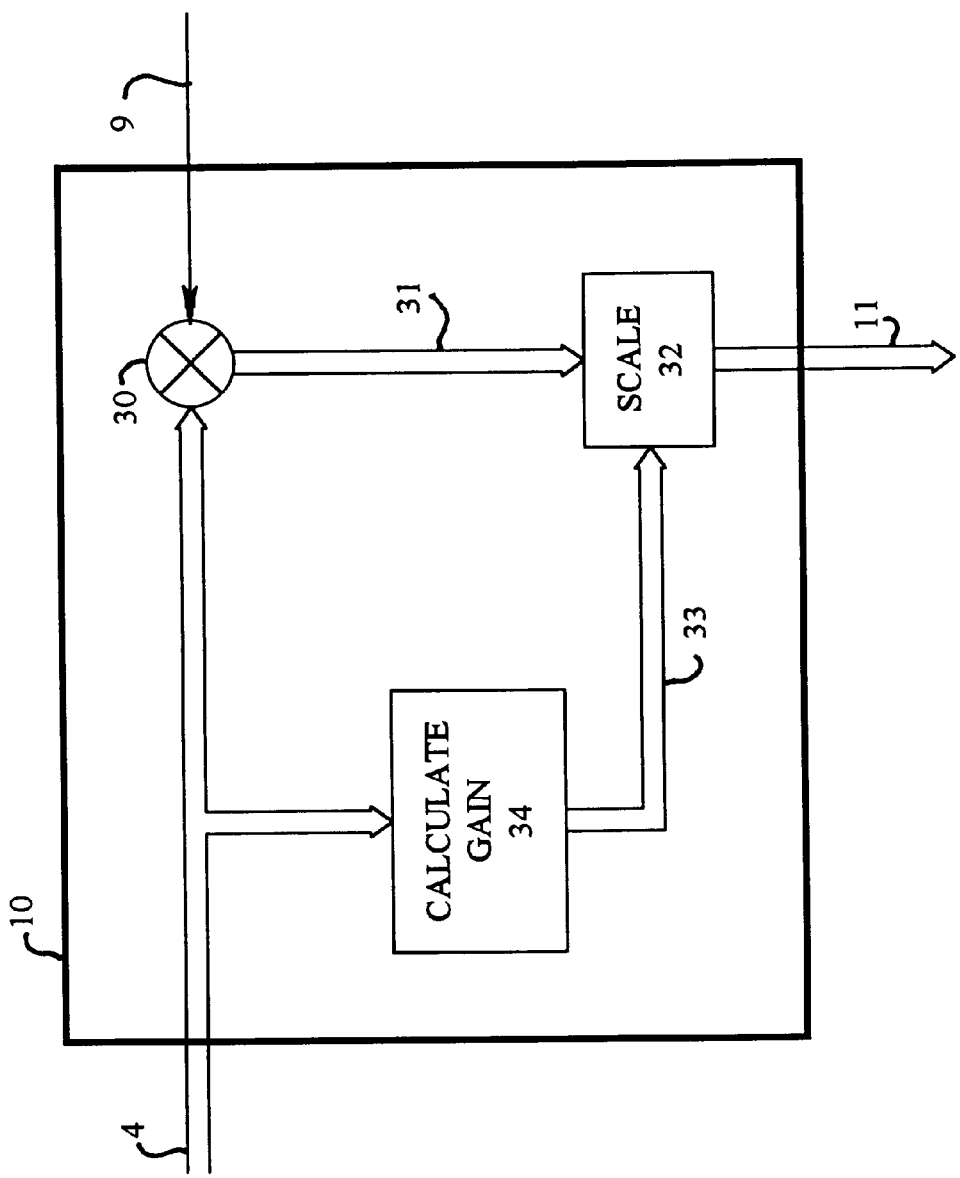
FIG. 5 is a diagrammatic view of a time-domain parameter adjustment means of the current invention.

This embodiment of the adjustment means 10" is depicted in FIG. 5. The signal vector $\phi$(n) 4" is multiplied by the error signal e(n) 9 at 30. The result 31 is scaled by gain G(n) at 32 to given the adjustment G(n)$\phi$(a)e(n) 11". The gain G(n) 33 is calculated from the signal vector 4" at 34.

The response parameters and disturbance parameters are updated according to $$\hat{a}(n|n-1) = \sum_{p=1}^{P_a-1} F_a(p)\hat{a}(n-p) \tag{49}$$

$$\hat{b}(n|n-1) = \sum_{p=1}^{P_b-1} F_b(p)\hat{b}(n-p) \tag{50}$$

$$e(n)=s(n)-\hat{b}(n|n-1)^T x(n)-\hat{a}(n|n-1)^T r(n) \tag{51}$$

$$\hat{a}(n)=\hat{a}(n|n-1)+k_a(n)e(n) \tag{52}$$

$$\hat{b}(n)=\hat{b}(n|n-1)+k_b(n)e(n) \tag{53}$$

where $k_a(n)$ is the vector obtained from the first J elements of k(n) and $k_b(n)$ is the vector obtained from the remaining K elements. Again, it is important to note that the parameter adjustments are linked since they all use the same error signal, e (n), which is dependent upon all of the parameters. This can be seen by rearranging the update equations as $$\hat{a}(n)=(I-k_a(n)r(n)^T)\hat{a}(n|n-1)-k_a(n)x^T(n)\hat{b}(n|n-1)+k_a(n)s(n) \tag{54}$$

$$\hat{b}(n)=(I-k_b(n)x(n)^T)\hat{b}(n|n-1)-k_b(n)r^T(n)\hat{a}(n|n-1)+k_b(n)s(n) \tag{55}$$

from which it is clear that the response parameters and the disturbance parameters are adjusted dependent upon one another Further, since the matrix $k_b(n)x(n)^T$ is generally not diagonal, it can be seen that the adjustment of each disturbance parameter depends upon the values of the other disturbance parameters. The same is true for the response parameters.

In prior order tracking systems, each order component is estimated independent of the other by passing it through a narrowband filter or by calculating a Fourier transform. This reduces the ability of the system to track rapidly changing parameters. In contrast, the current invention allows for the tracking of rapid changes in the disturbance parameters.

In prior system identification schemes, no account is taken of the component of the disturbance not due to the test signals. Instead, the component is assumed to be uncorrelated with the test signals. Consequently, correlation over long time periods must be used. Such systems can therefore only identify very slowly varying response parameters or else the test signal must be at a high level so as to generate a controlled disturbance that is at a high level compared to the other disturbances.

In the current invention, the disturbance is substantially eliminated from the signal used to update the response parameters, hence the parameters may be updated much more quickly and more accurately.

Other time domain updates will be apparent to those skilled in the art. For example, whitening filters may be used on the error signal and the reference or test signals so as to improve convergence speeds.

In many applications, the short term correlation between the reference signals x and the test signals r may be neglected. The gain vector $k_a(n)$ is then independent of r and the gain vector $k_b(n)$ is then independent of x. This particular embodiment is shown in FIG. 4. The response parameter adjustment means 10 depends upon the test signals 4 and the error signal 9, but not on the reference signals 4'. Similarly, the disturbance parameter adjustment means 10' depends upon the reference signals 4' and the error signal 9 but not on the test signals 4. Examples of the gain vectors used in the parameter adjustments include $$k_a(n) = K_a < x(n)x^T(n) + \sigma_a^2 >^{-1} x(n) \quad (56)$$

$$k_b(n) = K_b < r(n)r^T(n) + \sigma_b^2 >^{-1} r(n), \quad (57)$$

where $K_a$, $K_b$, $\sigma_a^2$, $\sigma_b^2$ are coefficients.

Frequency Domain Parameter Adjustment

In some embodiments the test signals or the reference signals take the form of delayed signals, for example $$x(n) = \{x(n), x(n-1), \ldots, x(n-K+1)\}^T, \quad (58)$$

or $$r(n) = \{t(n), t(n-1), \ldots, t(n-M+1)\}^T. \quad (59)$$

Figure 6:
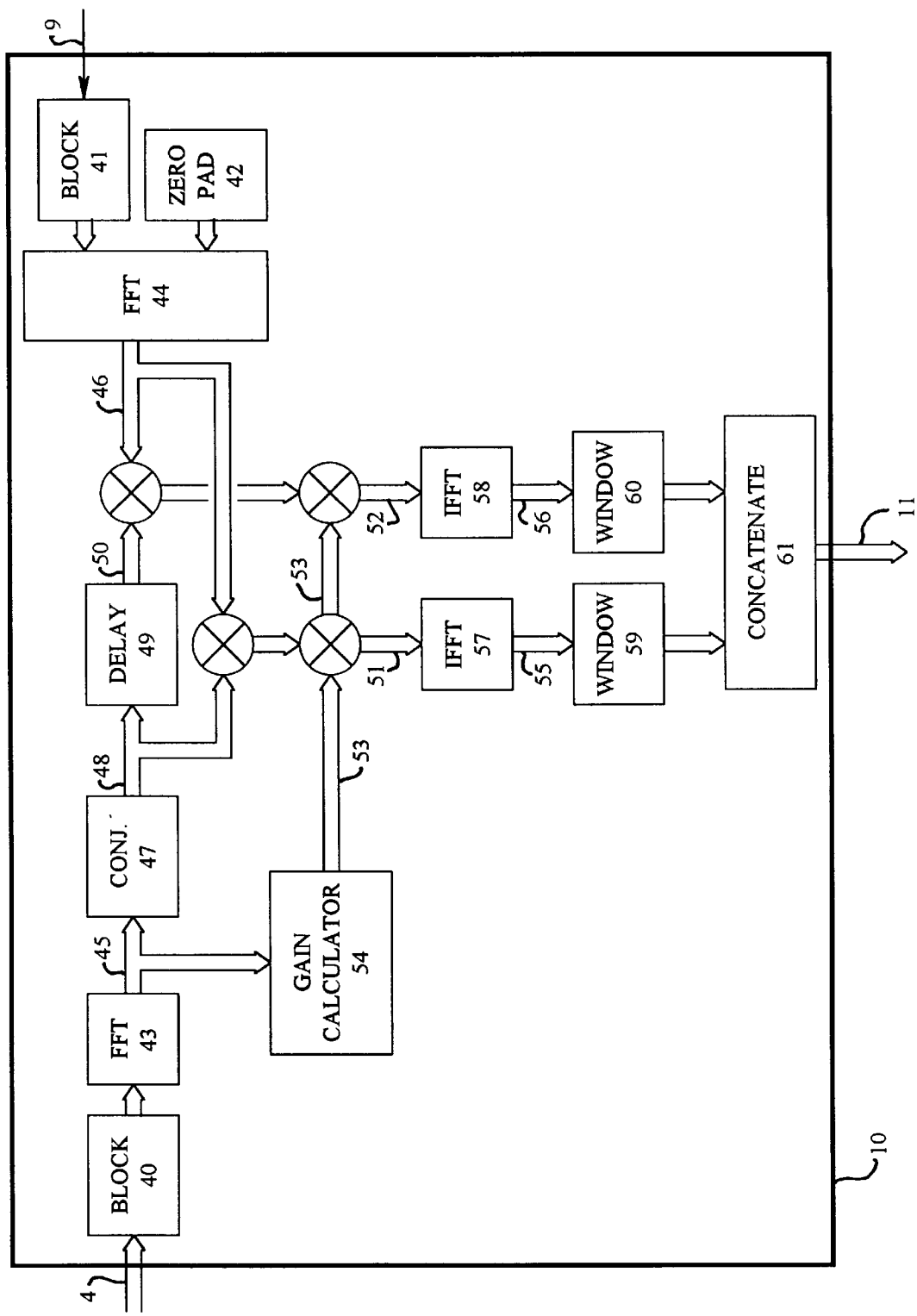
FIG. 6 is a diagrammatic view of a frequency-domain parameter adjustment means of the current invention.

In these case, one embodiment of the invention uses a frequency domain update of the parameter vector, as depicted in FIG. 6. The update of the response parameters $a(n) = \{c_0(n), c_1(n), \ldots, c_{M-1}(n)\}^T$ will be considered as an example.

Referring to FIG. 6, the test signal 4 is sectioned into overlapping blocks of M samples at 40 to give the $L^{th}$ block $$r_L = r(n=LM/2) = \{t(n), t(n-1), \ldots, t(n-M+1)\}^T \quad (60)$$

The error signal e(n) 9 is sectioned into blocks of M/2 samples at 41 and each block is padded with M/2 zeros at 42 to give $$e_L = \{e(n), e(n-1), \ldots, e(n-M/2+1), 0, \ldots, 0\}^T \quad (61)$$

which is of length M samples.

The blocks $r_L$ and $e_L$ are Fourier transformed at 43 and 44 respectively to give complex transforms $R_L$ 45 and $E_L$ 46. The complex vector $R_L$ is then conjugated at 47 to give $R_L^*$ 48 and then delayed at 49 to give delayed transform $R_{L-1}^*$ 50.

Frequency domain updates 51 and 52 are then calculated according to $$dA_0(k) = G(k) R_L^*(k) E_L(k) \quad (62)$$

$$dA_1(k) = G(k) R_{L-1}^*(k) E_L(k) \quad (63)$$

where $R_L(k)$ is the $k^{th}$ component of the Fourier transform of $r_L$ and $E_L(k)$ is the $k^{th}$ component of the Fourier transform of $e_L$. In the preferred embodiment, the frequency dependent gain G(k) 53 is calculated from $R_L(k)$ at 54 according to $$G(k) = \mu(|R_L(k)|^2 + |R_{L-1}(k)|^2 + \sigma^2)^{-1} \quad (64)$$

where $\mu$ is a positive step size and the constant $\sigma^2$ is included to prevent division by zero. The inverse transforms $da_0$ 55 and $da_1$ 56 are then calculated by passing $dA_0$ and $dA_1$ through inverse Fourier transformers 57 and 58.

The time domain updates are given by windowing $da_0$ and $da_1$ at 59 and 60 so as to retain only the first M/2 values and then concatenating at 61 according to $$dc_j = \begin{cases} da_0(j), & j < M/2 \\ da_1(j - M/2), & j \geq M/2 \end{cases} \quad (65)$$

to form the desired adjustment 11 to the $j^{th}$ element of the parameter vector, $c_j$.

This frequency domain update has rapid convergence properties. Other updates algorithms may be used, such as those described in 'Frequency Domain and Multirate Adaptive Filtering', IEEE Signal Processing Magazine, Vol. 9 No. 1, January 1992, by John J. Shynk.

Having described various preferred embodiments of the current invention, some example applications will now be described for which the novel features of the invention provide significant benefits over previous approaches.

Application 1—Tonal Disturbance Analysis

When the disturbance has one or more tonal components, the reference signals may be taken to be sine and cosine signals at frequencies which are multiples of the find a mental frequency of each disturbance source. The reference signals corresponding to the $m^{th}$ source are given by $$x_{2k,m}(n) = \cos(k\phi_m(n)) \quad (66)$$

$$x_{2k+1,m}(n) = \sin(k\phi_m(n)), \quad (67)$$

where $\phi_m(n)$ is the phase of the $m^{th}$ disturbance source at sample time n, which is determined by the current position in the cycle of the disturbance. $\phi_m(n)$ may be determined from a reference sensor or a reference signal, or it may be estimated from the sensor signal. The synthesized disturbance signal is given by $$\hat{u}(n) = \sum_{m=0}^{M-1} \sum_{k=0}^{K} (b_{2k,m} \cos(k\varphi_m(n)) + b_{2k+1,m} \sin(k\varphi_m(n))). \quad (68)$$

The disturbance parameter $b_{2k}(n)$ corresponds to the real part of the $k^{th}$ harmonic component of the disturbance while the disturbance parameter $b_{2k+1}(a)$ corresponds to the imaginary part of the $k^{th}$ harmonic component of the disturbance. The complex amplitude of the $k^{th}$ harmonic component of the disturbance at sample n is given by $$B_{k,m}(n) = b_{2k,m}(n) + i.b_{2k+1,m}(n), \quad (69)$$

where $i = (-1)^{1/2}$. The magnitude of the $k^{th}$ harmonic component of the disturbance due to the $m^{th}$ source at sample n is given by $$|B_{k,m}(n)| = (b_{2k,m}(n)^2 + b_{2k+1,m}(n)^2)^{1/2}. \quad (70)$$

These quantities may be displayed as a function of time (sample number) or fundamental period to provide an order plot of the disturbance.

Application 2—Machinery Monitoring

Figure 7:
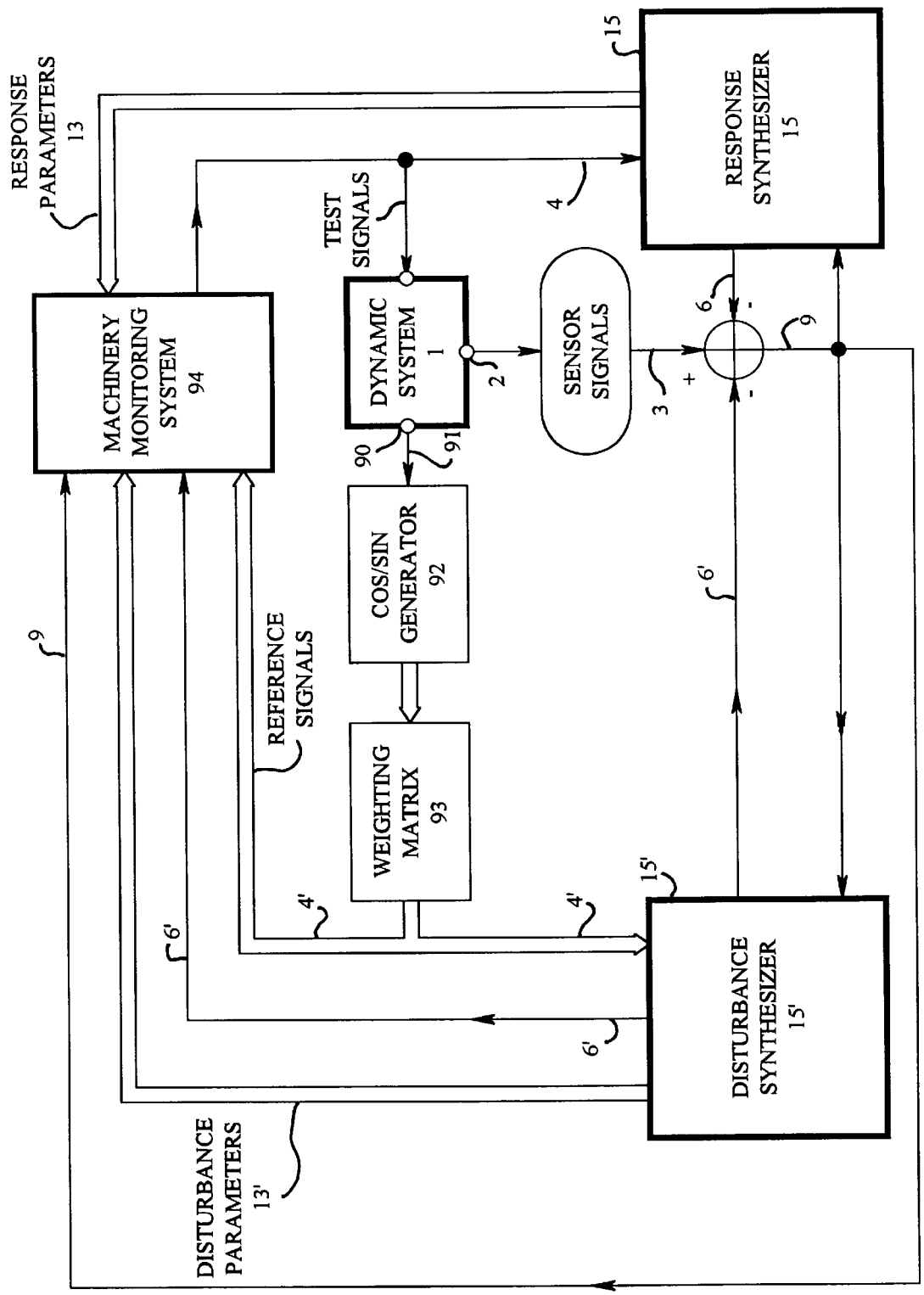
FIG. 7 is a diagrammatic view of a machinery monitoring system incorporating a dynamic system analyzer of the current invention.

In a further embodiment, shown in FIG. 7, the reference signals 4' are linear combinations of sine and cosine signals. A sensor 90, such as a tachometer or shaft encoder, provides a synchronizing signal 91 which is used by cosine/sine generator 92 to generate sine and cosine signals synchronized to the dynamic system or machine 1. The reference signals 4', which are preferably digital signals, are generated by passing the sine and cosine signals through an optional weighting network or matrix 93 to produce linear combinations of the sine and cosine signals. For example, the first linear combination may represent the combination of tones corresponding to the normal operation of a machine, while other combinations are orthogonal to the first combination. The relative level of the parameter associated with the first combination to the other parameters then provides a measure of the deviation of the machine from normal operation and may be used as an indicator that maintenance is required.

The linear combinations may be found by calculating the singular value decomposition of a matrix composed of vectors $B(n)=\{B_0(n), B_1(n), \ldots, B_{K/2-1}(n)\}^T$ measured under normal operating conditions. The singular vectors corresponding to the largest singular values are used to describe the normal operating condition, the remainder are used to describe deviations from the normal condition. The disturbance parameters 13' indicate the departure of the machine from normal operating conditions and are passed to the machinery monitoring system 94. The predicted disturbance parameters 5' may be used instead of the estimated parameters 13'.

The error signal e(n) 9 is a measure of the part of the disturbance that is not tonal. The level of the error signal is an important indicator of the condition of the machine, and so it is passed to the machinery monitoring system 94.

The machinery monitoring system may use the synthesized disturbance signal 6'. This is the part of the disturbance signal that is purely tonal in nature—i.e. uncorrelated noise has been removed. The disturbance signal is therefore an enhanced version of the sensor signal and may be used for further analysis.

In a further embodiment, the response parameters 13 are also estimated and passed to the machinery monitoring system 94. This allows changes in the structural or acoustic response of the system to be monitored. The predicted response parameters 5 may be used instead of the estimated parameters 13.

Application 3—Tonal Noise Control

The tonal noise control system of the current invention utilizes the tonal noise analyzer described above.

The response parameters $c_0^{ml}(n), c_1^{ml}(n), \ldots c_{K-1}^{ml}(n)$ represent the impulse response from the $l^{th}$ test signal to the $m^{th}$ sensor. The Fourier transform of the impulse response is the transfer function $C_{ml}(\kappa, n)$ at frequency $\kappa/KT_s$, where K is the length of the transform and $T_s$ is the sample period. In an active control system, the aim is often to reduce the tonal component of the disturbance by adding additional controlled disturbances to the dynamic system.

The controller signal for actuator l is formed by multiplying the reference signals by control parameters $Y_k^l(n)$ to produce a control signal $y^l(n)$, so that $$y^l(n) = \sum_{k=0}^{K-1} Y_k^l(n) x_k(n). \quad (71)$$

Introducing complex vector notation gives $$y(n) = real\left\{\sum_{k=0}^{K/2-1} Y_k(n) X_k^*(n)\right\}, \quad (72)$$

where $$Y_k(n)=\{Y_{2k}^0(n)+i.Y_{2k+1}^0(n), Y_{2k}^1(n)+i.Y_{2k+1}^1(n), \ldots, Y_{2k}^{L-1}(n)+i.Y_{2k+1}^{L-1}(n)\}^T \quad (73)$$

and $$X_k(n)=X_{2k}(n)+i.X_{2k+1}(n). \quad (74)$$

The control parameters $Y_k$ may be adjusted via a number of well known methods including $$Y_k(n+1)=(1-\mu)Y_k(n)-\mu C^\dagger(\kappa_k, n)(B_k(n)-C(\kappa_k, n)Y_k(n)) \quad (75)$$

where $C(\kappa_k, n)$ is the transfer function matrix with elements $C_{ml}(\kappa, n)$ evaluated at frequency $\kappa_k/NT_s$ corresponding to the frequency of the tonal component. $C^\dagger(\kappa_k, n)$ is a pseudo inverse of $C(\kappa_k, n)$ and $\mu$ is positive step size. This algorithm is described by G. P. Eatwell in 'Tonal Noise Control Using Harmonic Filters', Proc. Active 95, Newport Beach Calif., July 1995. However, the approach described in the referenced paper uses harmonic parameters $B_k(n)$ obtained by demodulation and filtering. The parameters so obtained are subject to inaccuracies due to corruption by test signals and by neighboring tonal components. The control system of the current invention will therefore provide more accurate control.

An alternative, simpler, adjustment is given by $$Y_k(n+1)=Y_k(n)-\mu C^\dagger(\kappa_k, n)B_k(n). \quad (76)$$

Figure 8:
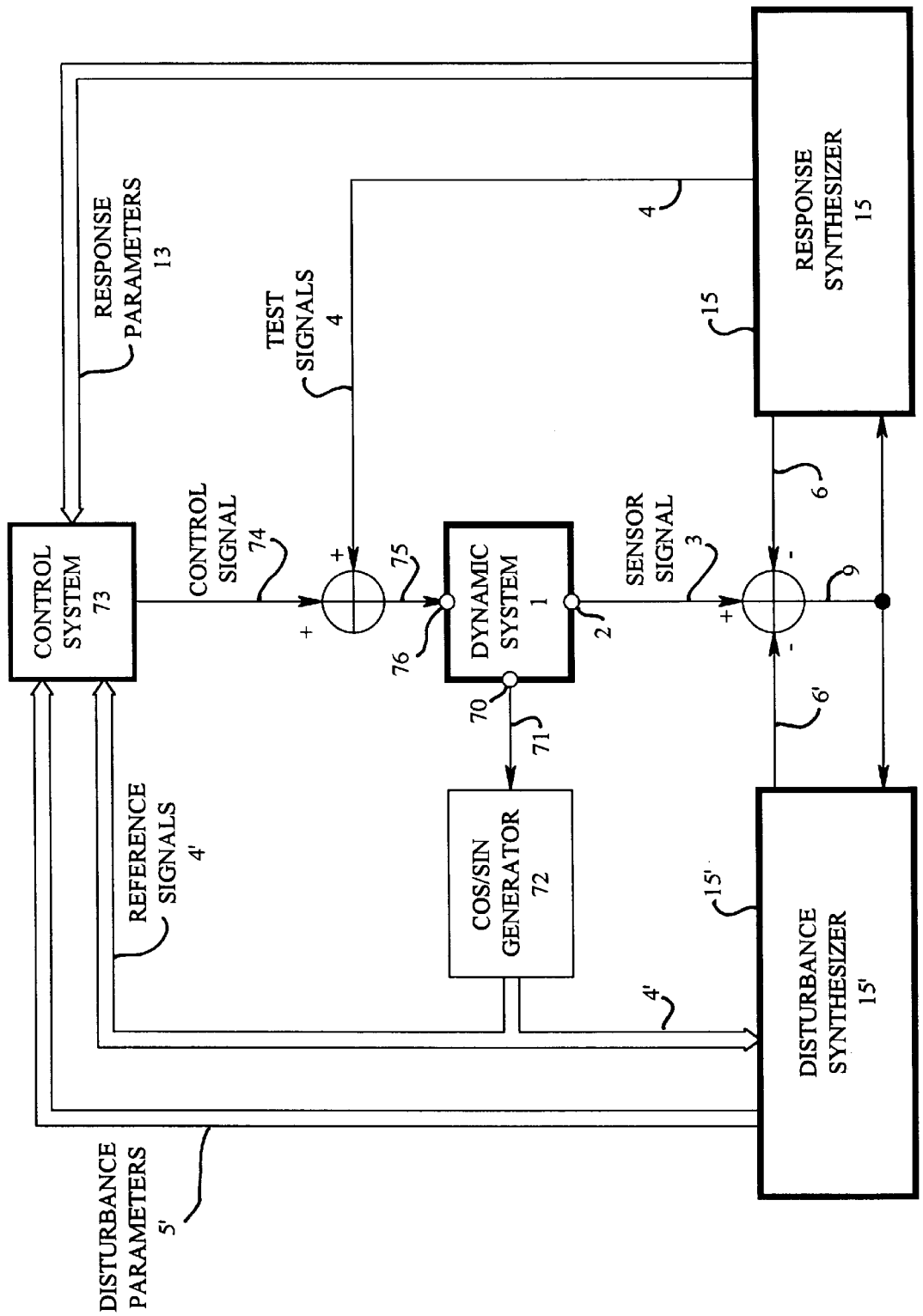
FIG. 8 is a diagrammatic view of an active control system for tonal noise incorporating a dynamic system analyzer of the current invention.

A tonal control system of the current invention is shown in FIG. 8. A sensor 70, which may be tachometer or accelerometer for example, provides a signal 71 related to the frequency or phase (timing) of the dynamic system. If more than one cyclic disturbance is present, additional sensors will be used. Signal 71 is used in reference signal generator 72 to produce cosine and sine reference signals 4'.

Control system 73 is responsive to the predicted disturbance parameters 5', the reference signals 4' and the response parameters 13. Optionally, the estimated disturbance parameters 13' may be used instead of 5', or the predicted response parameters 5 used instead of the estimated parameters 13. The control system produces control signals 74 which are combined with the test signals 4. The resulting combined signals 75 are used to drive actuators 76 which produce a controlled disturbance in the dynamical system.

Figure 9:
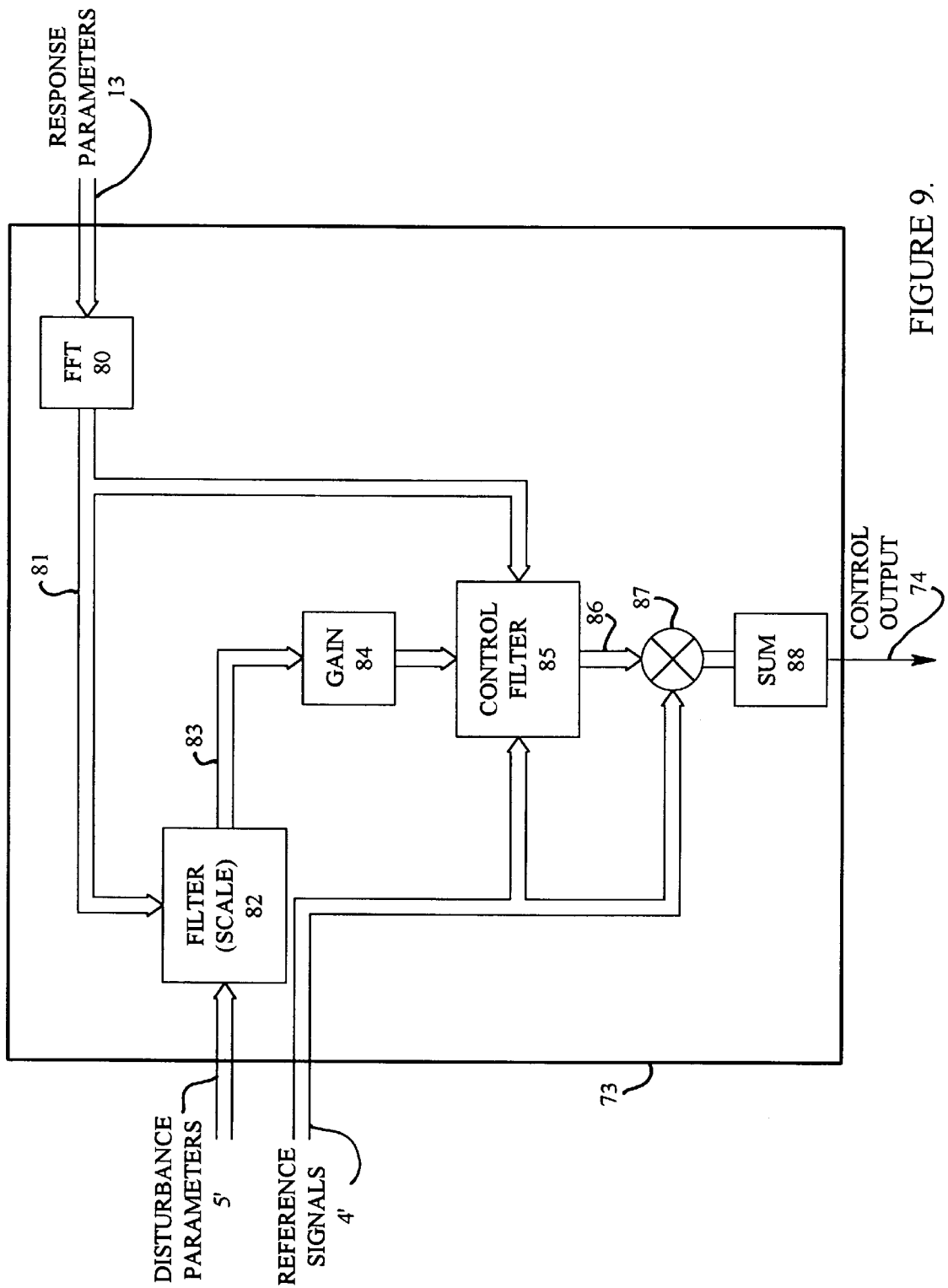
FIG. 9 is a diagrammatic view of a frequency-domain adaptive controller.

The preferred embodiment of the control system 73 is shown in FIG. 9. The response parameters 13 are passed through Fourier transformer 80 to produce the complex transfer function matrix $C(\kappa, n)$ 81. The predicted disturbance parameters $B_k(n)$ 5' are multiplied at 82 by a matrix which is dependent upon $C(\kappa, n)$ to produce filtered parameters 83. This matrix should compensate for the phase modification of the signals by the actuators, the sensors and the dynamic system. Examples of such matrices include C*(κ, n) and C†(κ, n). The filtered parameters are then multiplied by gain 84 and passed through control filter 85 to produce the control parameters $Y_k(n)$ 86. The control parameters are multiplied at 87 by the reference signals 4' and summed at 88 to produce the control signals 74.

Examples of the control filter 85 include simple integrators as in equation 76. The control filter may depend upon the transfer function matrix as in equation 75.

Application 4—Feedforward Control of Broadband Noise

Figure 10:
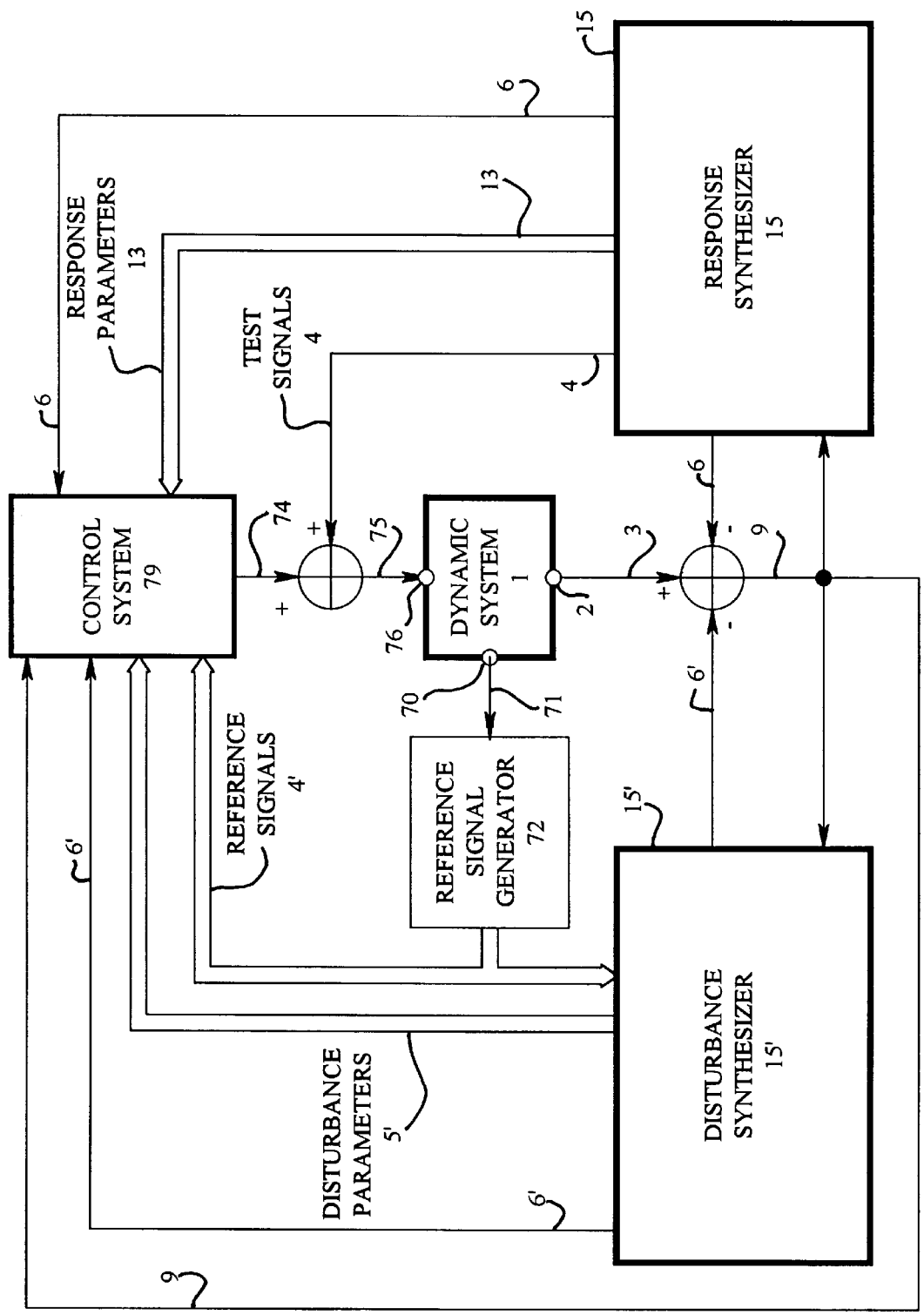
FIG. 10 is a diagrammatic view of an active control system for broadband or narrowband noise incorporating a dynamic system analyzer of the current invention.

One embodiment of a broadband control scheme of the current invention is shown in FIG. 10. In a single channel feedforward control system, the reference signals 4' are current and past values of the signal 71 from a reference sensor 70, i.e.

$$x_k(n) = x(n-k). \quad (77)$$

These signals are formed by sorting the sampled signal into overlapping blocks at reference signal generator 72.

The output 74 from control system 79 (see FIG. 11 for details) is given by $$y(n) = \sum_{k=0}^{K-1} h_k(n) x_k(n) \\ = \sum_{k=0}^{K-1} h_k(n) x(n-k), \quad (78)$$

where $h_k(n)$ is the $k^{th}$ coefficient of the control filter at time sample n.

The adjustment of the coefficients $h_k(n)$ uses the response parameters $a_k^{sen}(n)$, 13 (or the predicted parameters 5) the synthesized disturbance signal $\hat{u}(n)$ 6', the synthesized response signal $\hat{r}(n)$ 6 and the unmodelled component of the signal $\epsilon(n)$ 9.

In some applications the reference sensor is responsive to the effects of the control signal 71. In this case the reference signals are generated by subtracting the estimated effect of the controlled disturbance from the reference sensor signal. This gives $$x_k(n) = w(n-k), \quad (79)$$

where $$w(n) = x(n) - \sum_{k=0}^{K-1} a_k^{ref}(n) y(n-k) \quad (80)$$

and $a_k^{ref}(n)$ is the $k^{th}$ coefficient of the impulse response to the reference sensor. $a_k^{ref}(n)$ is estimated by the response synthesizer In this embodiment the reference signal generator 72 is responsive to the control signal 76 and the response parameters $a_k^{ref}(n)$.

The control filter coefficients $h_k$ are adjusted according to $$h_k(n+1) = h_k(n) - \mu g(n-k) f(n), \quad (81)$$

where $$f(n) = \sum_{k=0}^{K-1} f_k(n) \bar{s}(n-k) \quad (82)$$

$$g(n) = \sum_{k=0}^{K-1} g_k(n) x_k(n), \quad (83)$$

and $$\bar{s}(n) = \hat{u}(n) + \lambda e(n). \quad (84)$$

$\lambda$ is a positive constant and $\mu$, which is also positive, may depend upon the reference signals and the response parameters. The filter coefficients $f_k(n)$ and $g_k(n)$ are chosen so that the phase of the filter with coefficients.

$$d_k(n) = \sum_{j=0}^{K-1} a_{k-j}^{sen}(n) g_j(n) \quad (85)$$

is substantially equal to the phase of the filter with coefficients $f_k(n)$. $a_k^{sen}(n)$ is the $k^{th}$ coefficient of the impulse response to the (residual) sensor The control system produces control signals 74 which are combined with the test signals 4. The resulting combined signal 75 is used to drive actuators 76 which produce a controlled disturbance in the dynamic system.

Figure 11:
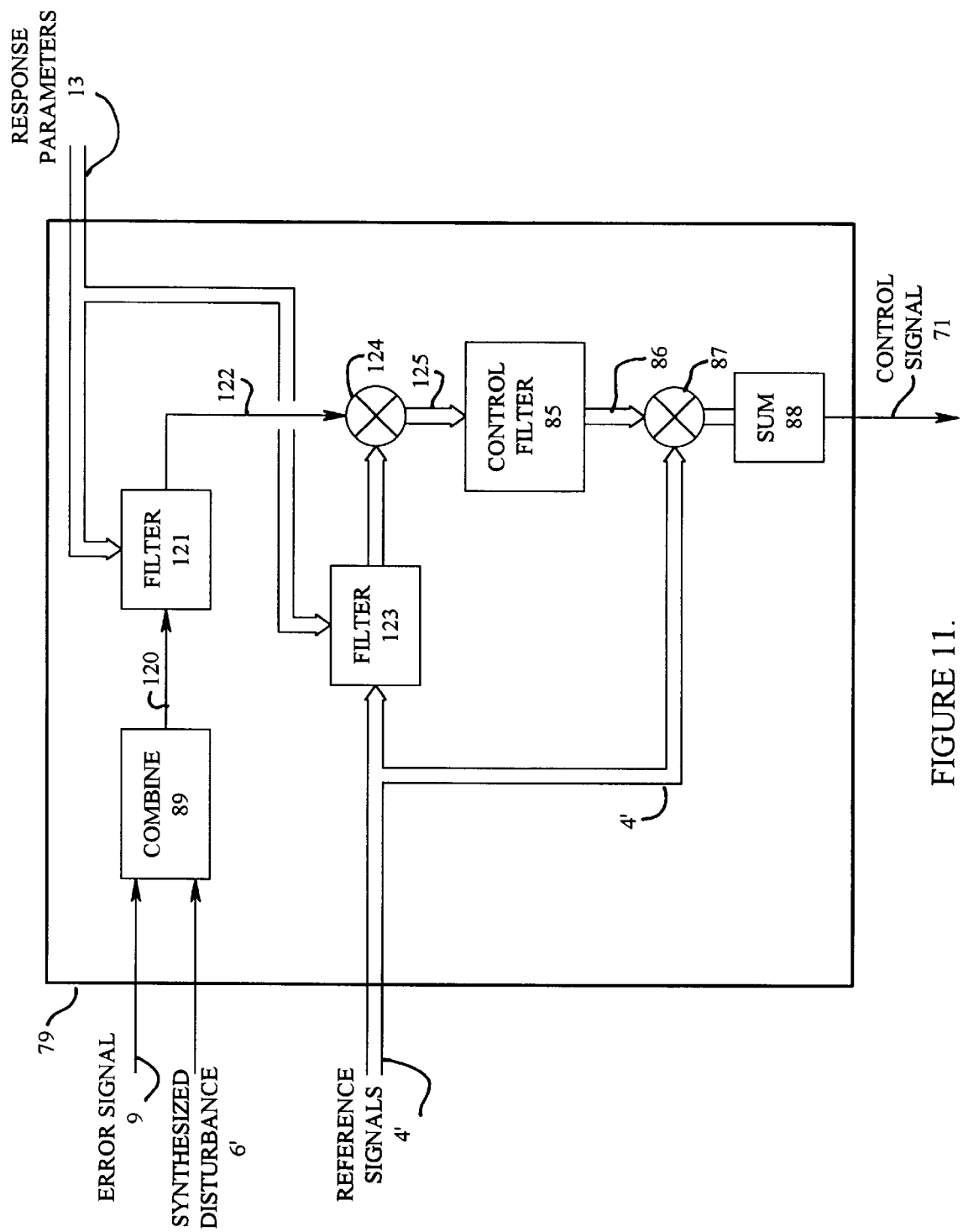
FIG. 11 is a diagrammatic view of a time-domain adaptive controller.

FIG. 11 shows one embodiment of control system 79.

In one embodiment the coefficients are given by $$g_k(n) = a_k^{sen}(n), \, f_k(n) = \delta k 0 \quad (86)$$

where $\delta_{k0}$ is the Kronecker delta. This gives $$h_k(n+1) = h_k(n) - \mu g(n-k) \bar{s}(n), \quad (87)$$

This algorithm is a modification to the well known filtered-x LMS algorithm (ref. Widrow). In the filtered-x algorithm the update is given by $$h_k(n+1) = h_k(n) - \mu g(n-k) s(n) \quad (88)$$

i.e. the update is proportional to the sensor signal s(n). In the modified algorithm the update is proportional to the synthesized disturbance signal $\hat{u}(n)$ and an estimate $e(n)$ of the unmodelled component of the signal. For $\lambda=0$ the update is proportional to the synthesized disturbance signal $\hat{u}(n)$ alone. The sensor signal contains components that are uncorrelated with the reference signals. These components cannot be controlled, but their presence will degrade the reduction of the controllable components. The synthesized error signal however is correlated with the reference signal and so an improved reduction of the controllable components will be achieved. The additional term multiplied by $\lambda$ may be included to prevent amplification of uncorrelated noise in the reference signals. The constant $\lambda$ is chosen to reflect the importance of amplification relative to reduction of the controllable part. The modified algorithm will be referred to as a synthetic error filtered-x LMS algorithm.

A diagrammatic view of the controller is shown in FIG. 11. The synthesized disturbance signal $\hat{u}(n)$ 6' and the unmodelled component $e(n)$ 9 are combined at 89 to produce the signal $\bar{s}(n)$ 120. This signal is filtered at 121 by the filter with coefficients $f_k(n)$. The result is signal $f(n)$ 122. The reference signals 4' are passed through filter 123 with coefficients $g_k(a)$ and then multiplied by the filtered error signal at 124 to produce the input 125 to the control filter 85. The outputs from the control filter are the controller parameters (coefficients) 86. Examples of the control filter 85 include a simple integrator as given by equation 81. The reference signals 4' are multiplied by the controller parameters 86 at 87 and summed at 88 to produce the controller output signal 71.

In a further embodiment, the filter coefficients are given by $$g_k(n)=\delta_{kK-1}, f_k(n)=a_{K-k-1}^{sen}(n) \qquad (89)$$

This is related to a filtered-error LMS algorithm, and will be referred to as a filtered synthetic error LMS algorithm.

Other update methods well known to those skilled in the art, such as those described in 'Adaptive Filter Theory', Simon Haykin, Prentice Hall Information and System Sciences Series, 2nd edition, 1991, may also be modified by replacing the signal s(n) by the signal $\bar{s}$(n). Thus, the current invention may be used with broadband multi-channel control systems.

In particular, the frequency domain update described above can be used. In this case the filtering of the reference signal and the error signal can also be performed in the frequency domain. This approach yields rapid convergence of the filter coefficients and is computationally efficient.

Application 5—Communication and Noise Control.

In some environments, noise control is required to facilitate communication between a person in a noisy environment and other people. In such environments, the sensor may be a microphone which can be used to provide a communication signal. Such a system is described in U.S. Pat. No. 5,033,082. In this system however, two control filters, 40 and 56 in the figure, are required. The first filter is used for noise reduction, the second filter is used to remove residual noise from the signal from microphone 36. In the noise control systems of the current invention, shown in FIGS. 8 and 10, the error signal 9 contains the component of the signal that is not correlated with the reference signal, and can therefore be used as a communication signal. No additional noise filtering is required.

Application 6—Data Compression.

The disturbance synthesizer shows how the signal can be synthesized from the disturbance parameters and the reference signal. The disturbance parameters are often very slowly varying in comparison to the sensor signals. That is, they have a much lower frequency bandwidth and can be subsampled without losing significant information. In a system where the analysis or processing of the signal is to be done remotely, it may therefore be advantageous to transmit only the disturbance parameters and the reference signal (or a signal from which it is derived), since this may require less data to be transmitted than if the sensed signals themselves were to be transmitted. An estimate of the original sensed signal can then be synthesized from this information at the remote location. When the disturbance is tonal, the frequency of the disturbance may be transmitted. When the disturbance is broadband, data compression is also achieved when the number of reference signals is smaller than the number of sensors. If more accuracy is required, the error signal(s) can also be transmitted. Even though the error signals have a bandwidth as high as the original signals, the dynamic range is much smaller Consequently, the error signals can be represented by fewer bits then the sensed signals and compression is still achieved.

Compression is also useful if the signals are to be stored for later analysis or processing.

In this embodiment of the current invention, the analysis system is used to pre-process the signals in the locality of the machine. The parameters and signals related to the reference signals are then used to form a compressed data signal which is then transmitted over a wired or wireless link to a remote site for further analysis and processing, or is stored for future analysis.

Figure 12:
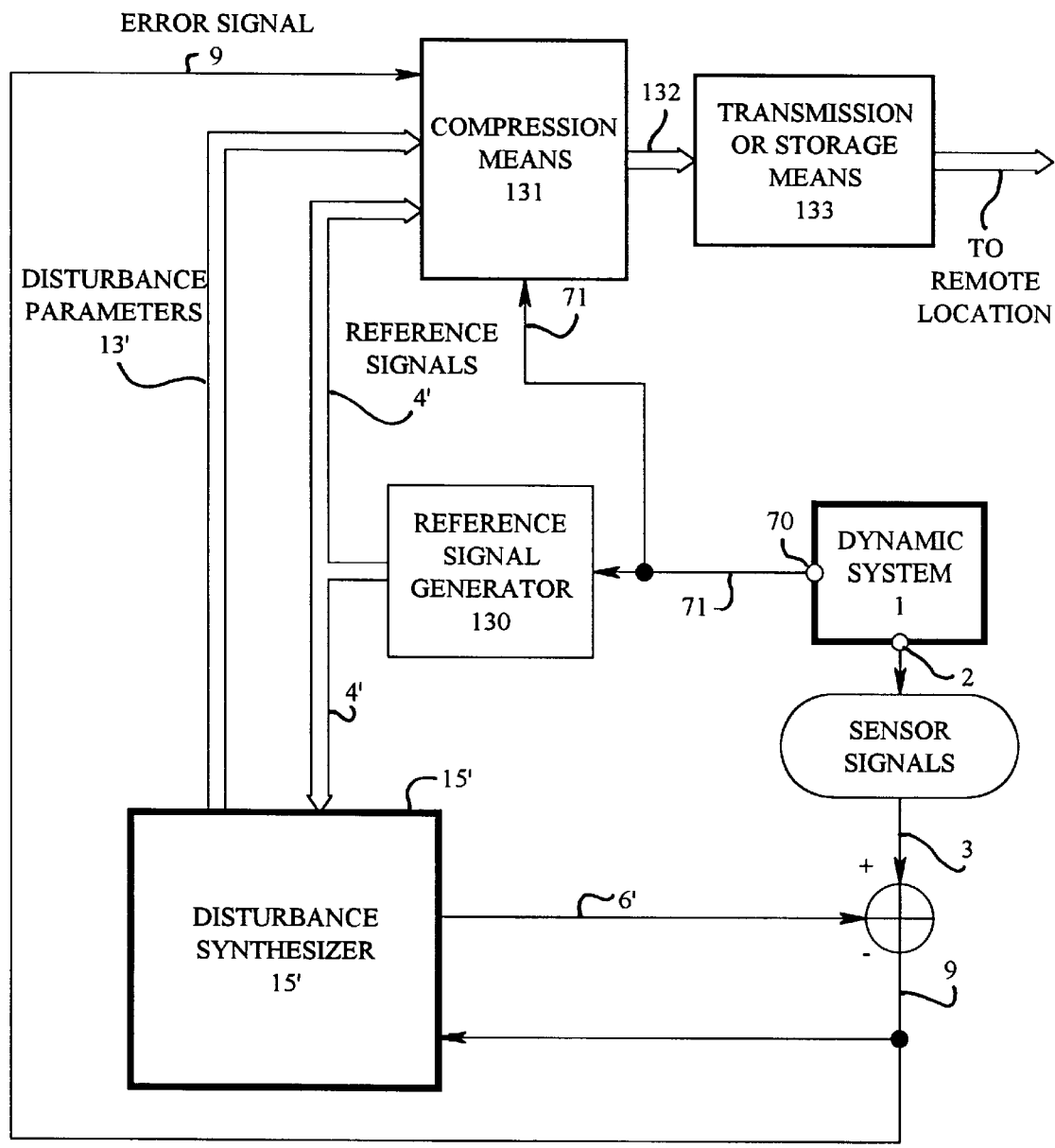
FIG. 12 is a diagrammatic view of a dynamic system analyzer combined with means for producing and transmitting a compressed characterization of the state of the dynamic system.

A diagrammatic view of this embodiment is shown in FIG. 12. The compression means 131 is responsive to the estimated disturbance parameters 13' (or predicted parameters 5'). The compression means 131 may also be responsive to the reference signals 4' (in the case of broadband disturbance) which are generated by reference signals generator 130, or measured signal 71 (which may be a frequency or timing signal in the case of a tonal disturbance). The compression means 131 produces a compressed data signal 132 which is passed to transmission or storage means 133. The transmission means may be, for example, a wireless link or a computer network link or a data bus. The storage means may, for example, be a magnetic or optical disc. The compression means 131 may also be responsive to the error signal 9.

The preferred embodiments of the invention which have been described, provide a method and apparatus for simultaneous characterization of the disturbance and the system response model of a dynamical system. This simultaneous characterization provides improvements in both the accuracy and speed of the characterization over previous systems which use independent characterization techniques. The current invention uses adaptive signal synthesis. One of the novel features of this approach is that the synthesis error signal (9 in FIGS. 3 and 4) provides additional information which is not available in prior system which use filtering techniques. When tonal disturbances are synthesized, this error signal relates to the broadband component of the signal. When stationary broadband signals are synthesized, this error corresponds to transient components in the signal. The current invention also allows both broadband and tonal signals to be synthesized simultaneously by using appropriate reference signals. This feature is not available in the prior art.

Further, several applications of the current invention have been described in which the novel features of the current invention provide considerable benefits over previous techniques. One application is for control systems in which the low throughput delay of the current system compared to prior systems provides improved performance. The simultaneous estimation of the disturbance parameters and the response parameters permit the use of lower level test signals. This reduces the disturbance caused by such signals and improves the accuracy and speed of the estimation of the dynamic response model.

While several preferred embodiments and applications of the invention have been described, with various possible modifications, enhancements and equivalents set forth, those of skill in the art will recognize that further improvements and modifications thereto are possible. The above description of the invention is therefore not to be considered to limit the invention, but is merely exemplary thereof; the invention is limited only by the following claims.

What is claimed is:

1. A method for estimating and updating parameters which characterize the state of a dynamical system subject to one or more disturbances comprising the steps of obtaining one or more first signals related in time or amplitude to the disturbances, sensing the system at one or more locations to obtain sensed signals indicative of the dynamical state of the system, generating predicted parameters from previously estimated parameters, generating a synthesized signal as a weighted sum of products of said first signals and said predicted parameters, and adjusting the predicted parameters according to an error signal which is the difference between the synthesized signal and the sensed signal to obtain new estimated parameters.

2. A method as in claim 1 in which the state of the system includes the disturbance of the system, said parameters include disturbance parameters characterizing the disturbance of the dynamical system, said disturbance is characterized as a sum of said first signals each weighted by a disturbance parameter, and at least one component of the synthesized signal is a synthesized disturbance signal.

3. A method as in claim 1 in which said first signals include reference signals obtained from sensors responsive to the disturbance of the dynamic system.

4. A method as in claim 1 in which said predicted parameters are obtained by passing previously estimated parameters through a low pass filter.

5. A method as in claim 1 in which the adjustment of the parameters is dependent upon said first signals.

6. A method as in claim 1 in which the adjustment of the parameters is proportional to said error signal and to a gain which is dependent upon an estimate of the variance of the error signal.

7. A method as in claim 1 in which one or more of said disturbances is substantially cyclic in time and which said first signals include one or more cyclic reference signals which are time or phase related to the cyclic disturbance or to the source of the cyclic disturbance.

8. A method as in claim 7 in which said cyclic reference signals are sine and cosine signals at multiples of the period of the cyclic disturbance.

9. A method as in claim 8 in which the disturbance is synthesized as $$\sum_{m=0}^{M-1}\sum_{k=0}^{K}(b_{2k,m}\cos(k\varphi_m(n))+b_{2k+1,m}\sin(k\varphi_m(n))),$$

where m is the index of the disturbance, k is a harmonic number, $b_{k,m}$ are disturbance parameters and $\phi_m(n)$ is a signal which phase related to the $m^{th}$ disturbance source at sample n, and in which the state of the system is characterized by the complex amplitudes $B_{k,m}=b_{2k,m}+i.b_{2k+1,m}$.

10. A method as in claim 7 in which said cyclic reference signals are combinations of sine and cosine signals at multiples of the period of the cyclic disturbance.

11. A method as in claim 1 in which said parameters include response parameters characterizing the dynamic response of the system, said method including the steps of generating a test signal so as to produce a controlled disturbance in said dynamical system, and synthesizing a synthesized response signal from current and past values of the test signal and from the response parameters, wherein said first signals include said test signal.

12. A method as in claim 11 and including the step of adjusting said response parameters according to a time domain algorithm in which the adjustment to the parameters is proportional to the product of the error signal and a gain, said gain being dependent upon the reference signals.

13. A method as in claim 11 and including the step of adjusting said response parameters according to a frequency domain algorithm in which the Fourier transform of the adjustment to the parameters is proportional to the product of the Fourier transform of the error signal and the complex conjugate of the Fourier transform of the reference signals.

14. A method as in claim 1 in which the adjustment of one or more of the estimated parameters is dependent on the values of other estimated parameters.

15. A method as in claim 1 in which said dynamic system is a machine, said method including the step of monitoring the changes in said predicted or estimated parameters over a period of time so as to detect changes in the condition of said machine.

16. A method as in claim 15 in which said error signal is also monitored.

17. A method as in claim 15 in which variations in the synthesized signal are also monitored.

18. A method as in claim 15 in which said parameters include response parameters and disturbance parameters which are estimated jointly.

19. A method for controlling the state of a dynamical system subject to one or more disturbances, where the state is characterized by a set of parameters, comprising the steps of selecting initial values for the estimated parameters and then repeating the steps of sensing the system at one or more locations to obtain sensed signals indicative of the state of the system, obtaining one or more first signals related in time or amplitude to the disturbances, generating predicted parameters from said previously estimated parameters, generating a synthesized signal as a weighted sum of the first signals and the predicted parameters, adjusting the predicted parameters according to an error signal which is the difference between the synthesized signal and the sensed signal to obtain new estimated parameters, generating a control signal dependent upon the estimated parameters, and supplying said control signal to an actuator so as to generate controlled disturbances in said dynamic system and thereby control the state of said system.

20. A method as in claim 19 in which the state of the system includes the disturbance of the system, said parameters include said disturbance parameters, said first signals include one or more reference signals from sensors responsive to the disturbance or the source of the disturbance, and said disturbance is characterized as sum of said reference signals each weighted by a disturbance parameter.

21. A method as in claim 19 in which said parameters include response parameters said first signals include a test signal which is added to said control signal, and the state of the system includes a dynamic response model of the system which is characterized by said response parameters.

22. A method as in claim 19 in which said control signal is also dependent upon said synthesized signal.

23. A method as in claim 19 in which said control signal is also dependent upon said error signal.

24. A system for analyzing the state of a dynamical system subject to one or more disturbances, in which the state of the system includes the disturbance of the system and the disturbance is characterized by a set of disturbance parameters, comprising:

sensors at one or more locations producing sensed signals, reference signal generating means for generating reference signals related to said disturbances, disturbance signal synthesizer means for combining said reference signals with the set of disturbance parameters to produce a synthesized disturbance signal, signal subtraction means for producing an error signal corresponding to the difference between said sensed signal and said synthesized signal, and disturbance parameter adjustment means for adjusting said parameters in response to said error signal.

25. A system as in claim 24 in which the disturbance at sample n is synthesized as $$\sum_{m=0}^{M-1}\sum_{k=0}^{K}(b_{2k,m}\cos(k\varphi_m(n)) + b_{2k+1,m}\sin(k\varphi_m(n))),$$

where m is the index of the disturbance, k is a harmonic number, $b_{k,m}$ are disturbance parameters and $\varphi_m(n)$ is a signal which phase related to the $m^{th}$ disturbance source at sample n, and in which the state of the system is characterized by the complex amplitudes $B_{k,m}=b_{2k,m}+i.b_{2k+1,m}$.

26. A system as in claim 24 in which the disturbance at sample n is synthesized as $$\sum_{m=0}^{M-1}\sum_{k=0}^{K} b_{km} x_m(n-k), \quad (90)$$

where m is the index of the reference signal, k is a parameter index, $b_{km}$ are disturbance parameters and $x_m(n)$ is the $m^{th}$ reference signal at sample n.

27. A system as in claim 26 in which said disturbance parameter adjustment means operates according to a time domain algorithm in which the adjustment to the disturbance parameters is proportional to the product of the error signal and a gain, said gain being dependent upon the reference signals.

28. A system as in claim 26 in which said disturbance parameter adjustment means operates according to a frequency domain algorithm in which the Fourier transform of the adjustment to the disturbance parameters is proportional to the product of the Fourier transform of the error signal and the complex conjugate of the Fourier transform of the reference signal.

29. A system as in claim 24, in which the state of the system includes the dynamic response of the system and the dynamic response is characterized by a set of response parameters, said system further including:

test signal generating means for generating test signals, actuator means responsive to said test signals for generating controlled disturbances in said dynamical system response signal synthesizer means for combining said test signals with a set of response parameters to produce a synthesized response signal, response parameter adjustment means for adjusting said response parameters in accordance with said error signal, wherein said error signal corresponds to the said sensed signal minus said synthesized disturbance signal and minus said synthesized response signal.

30. A system as in claim 29 in which said response parameter adjustment means operates according to a time domain algorithm in which the adjustment to the response parameters is proportional to the product of the error signal and a gain, said gain being dependent upon the test signals.

31. A system as in claim 29 in which said response parameter adjustment means operates according to a frequency domain algorithm in which the Fourier transform of the adjustment to the response parameters is proportional to the product of the Fourier transform of the error signal and the complex conjugate of the Fourier transform of the reference signal.

32. A system as in claim 29 in which said dynamical system is a machine and including machinery monitoring means for monitoring the time variations in said disturbance parameters and said response parameters, wherein said machinery monitoring means periodically monitors said parameters so as to determine the condition of the machine.

33. A system as in claim 24 in which said dynamical system is a machine and including machinery monitoring means for monitoring the time variations in said disturbance parameters and periodically comparing said parameters with those expected from known operating or fault conditions so as to determine the condition of the machine.

34. A system as in claim 33 in which said machinery monitoring means also monitors said error signal.

35. A system as in claim 33 in which said machinery monitoring means also monitors said synthesized disturbance signal.

36. A system as in claim 24 and including signal compression means which is responsive to said disturbance parameters and produces a compressed data signal.

37. A system as in claim 36 and including transmission means for transmitting said compressed data signal to a remote location for further processing or analysis.

38. A system as in claim 36 and including storage means for storing said compressed data signal.

39. A system as in claim 36 in which said signal compression means is also responsive to said reference signals, or to a signal from which said reference signals are derived.

40. A system for controlling the state of a dynamical system subject to one or more disturbances in which the state of the system includes the disturbance of the system, characterized by a set of disturbance parameters and also includes the dynamic response of the system, characterized by a set of response parameters, comprising sensor means at one or more locations producing sensed signals indicative of the state of said dynamical system, reference signal generating means for generating reference signals related to said disturbances, disturbance signal synthesizer means for combining said reference signals with a set of disturbance parameters to produce a synthesized disturbance signal, test signal generating means for generating test signals, response signal synthesizer means for combining said test signals with a set of response parameters to produce a synthesized response signal, signal subtraction means for producing an error signal corresponding to said sensed signal minus said synthesized disturbance signal and minus said synthesized response signal, disturbance parameter adjustment means for adjusting said disturbance parameters in response to said error signal, response parameter adjustment means for adjusting said response parameters in response to said error signal, controller means responsive to said response parameters and said reference signals and generating a control signal, and actuator means responsive to said control signal for generating controlled disturbances in said dynamical system, thereby controlling the state of said system.

41. A system as in claim 40 in which said controller means is also responsive to said synthesized disturbance signal and said error signal or a combination thereof.

42. A system as in claim 40 in which said controller means is also responsive to said disturbance parameters.

43. A system as in claim 40 in which said reference signals are sine and cosine signals and in which the control signal is dependent upon the Fourier transform of the response parameters.

44. A control system as in claim 40 which includes multiple sensors and multiple actuators.

45. A control system as in claim 40 in which said sensor means is a microphone which is responsive to speech in the vicinity of the microphone and in which said error signal is used to communicate the speech to a remote location.

* * * * *